US011627412B2

(12) United States Patent
Filson et al.

(10) Patent No.: US 11,627,412 B2
(45) Date of Patent: Apr. 11, 2023

(54) PORTABLE ELECTRONIC DEVICE CONTROL

(71) Applicant: Apple Inc., Cupertino, CA (US)

(72) Inventors: John Benjamin Filson, Mountain View, CA (US); Pinida Jan Moolsintong, Cupertino, CA (US); Emery A. Sanford, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1172 days.

(21) Appl. No.: 14/570,038

(22) Filed: Dec. 15, 2014

(65) Prior Publication Data

US 2015/0098591 A1 Apr. 9, 2015

Related U.S. Application Data

(63) Continuation of application No. 12/398,160, filed on Mar. 4, 2009, now Pat. No. 8,913,771.

(51) Int. Cl.
*H04R 5/033* (2006.01)
*H04R 3/00* (2006.01)
(Continued)

(52) U.S. Cl.
CPC .............. *H04R 3/00* (2013.01); *A45F 5/021* (2013.01); *G04B 37/02* (2013.01); *G06F 1/1626* (2013.01);
(Continued)

(58) Field of Classification Search
CPC ................ H04R 2499/11; H04R 5/033; H04R 2420/05; H04M 1/6058
(Continued)

(56) References Cited

U.S. PATENT DOCUMENTS 4,065,681 A * 12/1977 Beyers, Jr. ................ H03J 9/00
348/730
4,546,266 A * 10/1985 Zenick .................... B60K 28/00
361/172
(Continued)

FOREIGN PATENT DOCUMENTS

| CN | 1765059 | 4/2006 |
| EP | 1615465 | 1/2006 |
| GB | 2241840 | 9/1991 |

OTHER PUBLICATIONS

Author Unknown, "I Dropped My iPhone in Water," https://web.archive.org/web/20081020060046/http://forums.macrumors.com/showthread.php?t=333958, 6 pages, Jul. 25, 2007.
(Continued)

*Primary Examiner* — George C Monikang
(74) *Attorney, Agent, or Firm* — BakerHostetler

(57) ABSTRACT

Electronic devices such as compact portable media players are provided. A housing for an electronic device may be relatively compact. The housing may include a door assembly with an attached spring-loaded clip. The electronic device may include a hold switch. Depending on the state of the hold switch, the electronic device may be in an off mode, a continuous playback mode, or a shuffle playback mode. The electronic device may not have integrated media playback controls such as play, pause, rewind, fast forward, etc. As one example, the electronic device may connect to an accessory that has media playback controls. Buttons and other user interfaces may be included in the accessory and user input information may be conveyed between the accessory and the electronic device using a wired path including audio connectors. The electronic device may include a printed circuit board assembly that is nested together with a battery assembly.

14 Claims, 19 Drawing Sheets

(51) Int. Cl.

| | | |
|---|---|---|
| *G04B 37/02* | (2006.01) | |
| *H04M 1/05* | (2006.01) | |
| *H04M 1/60* | (2006.01) | |
| *H04R 1/02* | (2006.01) | |
| *A45F 5/02* | (2006.01) | |
| *G06F 1/16* | (2006.01) | |
| *H04R 1/10* | (2006.01) | |
| *A45C 11/00* | (2006.01) | |

(52) U.S. Cl.
CPC ............ *G06F 1/1656* (2013.01); *H04M 1/05* (2013.01); *H04M 1/6058* (2013.01); *H04R 1/02* (2013.01); *A45C 2011/002* (2013.01); *A45F 2200/0516* (2013.01); *H04R 1/1041* (2013.01); *H04R 5/033* (2013.01); *H04R 2201/103* (2013.01); *H04R 2420/09* (2013.01); *H04R 2460/03* (2013.01); *H04R 2499/11* (2013.01)

(58) Field of Classification Search
USPC .............................................. 381/58, 74, 59
See application file for complete search history.

(56) References Cited

U.S. PATENT DOCUMENTS

| | | | |
|---|---|---|---|
| 5,189,581 A | 2/1993 | Schroder et al. | |
| 5,420,739 A | 5/1995 | Yokozawa et al. | |
| 5,572,576 A * | 11/1996 | Klausner | H04M 1/575 379/88.21 |
| 5,610,878 A | 3/1997 | Pretat et al. | |
| 5,727,290 A | 3/1998 | Gilbert et al. | |
| 6,364,184 B1 | 4/2002 | Hauck et al. | |
| 6,400,814 B1 * | 6/2002 | Adams | H04M 1/663 379/142.01 |
| 6,822,420 B2 | 11/2004 | Kozu et al. | |
| 6,892,083 B2 | 5/2005 | Shostak | |
| 7,222,307 B2 | 5/2007 | Morris et al. | |
| 7,243,334 B1 * | 7/2007 | Berger | G06Q 40/12 717/109 |
| 7,349,741 B2 | 3/2008 | Maltan et al. | |
| 7,421,073 B2 | 9/2008 | Tages et al. | |
| 7,433,546 B2 | 10/2008 | Marriott et al. | |
| 7,536,565 B2 | 5/2009 | Girish et al. | |
| 7,593,782 B2 | 9/2009 | Jobs et al. | |
| 7,628,491 B2 | 12/2009 | Kaplan | |
| 7,724,532 B2 | 5/2010 | Zadesky et al. | |
| 7,889,497 B2 | 2/2011 | Jobs et al. | |
| 7,983,722 B2 | 7/2011 | Lowles et al. | |
| 8,090,130 B2 | 1/2012 | Zorkendorfer et al. | |
| 8,094,673 B2 | 1/2012 | Proctor et al. | |
| 8,116,503 B2 | 2/2012 | Daniels et al. | |
| 8,194,890 B2 | 6/2012 | Konaka et al. | |
| 8,260,380 B2 | 9/2012 | Kim | |
| 8,693,702 B2 | 4/2014 | Nho | |
| 2002/0002039 A1 * | 1/2002 | Qureshey | G06F 16/686 455/188.1 |
| 2005/0254669 A1 * | 11/2005 | Bose | G11B 20/10 381/105 |
| 2006/0193273 A1 * | 8/2006 | Passier | G08C 17/02 370/310 |
| 2006/0196902 A1 | 9/2006 | Chen et al. | |
| 2006/0209641 A1 | 9/2006 | Navid | |
| 2007/0025561 A1 * | 2/2007 | Gauger, Jr. | H04R 1/1025 381/384 |
| 2007/0053523 A1 * | 3/2007 | Iuliis | A45F 5/00 381/77 |
| 2007/0165371 A1 | 7/2007 | Brandenburg | |
| 2008/0089539 A1 * | 4/2008 | Ishii | H04R 1/1041 381/74 |
| 2008/0101623 A1 | 5/2008 | Gleissner et al. | |
| 2009/0156129 A1 * | 6/2009 | Hassan | G06F 9/5044 455/66.1 |

OTHER PUBLICATIONS

Buil et al., "Headphone with Touch Control," ACM International Conference Procedding Series, vol. 111, Salzburg, Austria, pp. 377-378, ISBN: 1-59593-089-2, Sep. 2005.

Gardner, Chris, "the $200 iPhone "water penalty" (don't you DARE get it wet!)," https://discussions.apple.com/thread/1619330, 4 pages, Jul. 19, 2008.

European Search Report, EP10155328.7, 8 pages, dated May 14, 2013.

* cited by examiner

PORTABLE ELECTRONIC DEVICE CONTROL

CROSS-REFERENCE TO RELATED APPLICATION

This application is a continuation patent application of U.S. patent application Ser. No. 12/398,160, filed Mar. 4, 2009 and titled "Portable Electronic Device," the disclosure of which is hereby incorporated herein by reference in its entirety.

BACKGROUND

This invention relates generally to electronic devices, and more particularly, to portable electronic devices such as compact portable electronic devices that use space efficiently.

Handheld electronic devices and other portable electronic devices are becoming increasingly popular. Examples of handheld devices include media players, handheld computers, cellular telephones, and hybrid devices that include the functionality of multiple devices of this type. Popular portable electronic devices include laptop computers and tablet computers. Portable electronic devices may also be somewhat smaller devices. Examples of smaller portable electronic devices include compact media players, wristwatch devices, pendant devices, headphone and earpiece devices, and other wearable and miniature devices. Devices such as these are often small enough to be held in the hand and may sometimes be referred to as handheld electronic devices.

It is generally desirable to reduce the size of compact portable electronic devices such as handheld or wearable media players. At the same time, compact portable electronic devices such as media players typically require a minimum amount of hardware to be functional. In addition, if the size of certain hardware components such as batteries is reduced by too much, the functionality of the compact portable electronic devices may be compromised (e.g., the devices may have unsatisfactory battery lives). It is therefore often difficult to construct compact electronic devices that occupy a minimal amount of volume while maintaining a desired level of functionality.

It would therefore be desirable to be able to provide improved portable electronic devices.

SUMMARY

Portable electronic devices and accessories for electronic devices are provided. The electronic devices may be handheld electronic devices such as media players or any other suitable computing equipment. These devices typically generate audio signals. The audio signals may be used to drive speakers in accessories such as headsets and other equipment capable of presenting sound to a user.

A housing for an electronic device such as a compact portable media player may be relatively compact. For example, the housing may have approximate dimensions of several centimeters or less. A battery assembly and a printed circuit board assembly may be nested together in the housing to reduce the space occupied by these assemblies. The housing may include a door assembly with an attached clip. The clip may be spring-loaded and may be used to secure the media player. For example, the clip may be used to secure the media player to a user's clothing.

The electronic device may include a status indicator. With one suitable arrangement, the status indicator may be formed from multiple LEDs each of which displays a different color or from a multicolor LED. As one example, the status indicator may display a green light when a battery level is above a first threshold, a yellow light when the battery level is below the first threshold and above a second threshold, a red light when the battery level is below the second threshold, and may not display a light whenever the device is off. The status indicator may display a light when the status of the device changes, at regular intervals, continuously, or at combinations of these and other times, if desired. The status indicator may be provided on an end face of the device housing with other components such as an audio jack and a user-controllable switch.

The electronic device may include a hold switch. The hold switch may have three states, as an example. The hold switch may configure the state of the electronic device. As one example, the device may be turned off when the switch is in the first state, may be in a continuous playback mode when the switch is in the second state, and may be in a random playback mode when the switch is in the third state. In the random playback mode, the device may play back media files in a random order and, in the continuous playback mode, the device may play back media files in a pre-determined order. If desired, the electronic device may override the hold switch and turn itself off if no user input is received for a given period of time (e.g., the electronic device may incorporate an auto-off feature).

The electronic device may include a connector through which an accessory can be coupled to the device. For example, the electronic device may include an audio jack (e.g., a three contact female audio connector) configured to receive a connector sometimes referred to as a tip-ring-sleeve (TRS) plug. If desired, the electronic device may include a four-connector audio jack sometimes referred to as a tip-ring-ring-sleeve (TRRS) jack. The connector may include a recessed insulator. The recessed insulator may be below the surface of the surrounding housing structure of the electronic device. This type of arrangement may help to prevent an audio plug from rubbing against the housing of the electronic device that surrounds the audio jack.

If desired, the electronic device may not include physical controls for media playback operations. For example, the electronic device may not have buttons to receive media playback commands from a user such as play, pause, fast forward, rewind, skip track (e.g., change tracks), volume up, volume down, mute, etc. With one suitable arrangement, the electronic device may receive media playback commands and other commands from an accessory connected to the electronic device through an audio connector such as a TRS jack and a TRS plug.

Further features of the invention, its nature and various advantages will be more apparent from the accompanying drawings and the following detailed description of the preferred embodiments.

DETAILED DESCRIPTION

The present invention relates generally to electronic devices, and more particularly, to portable electronic devices.

The portable electronic devices may be handheld electronic devices such as media players, handheld computers, cellular telephone, and hybrid devices that include the functionality of multiple devices of this type. Portable electronic devices may also be somewhat smaller devices. Examples of smaller portable electronic devices include compact media players, wristwatch devices, pendant devices, headphone and earpiece devices, and other wearable and miniature devices. Devices such as these are often small enough to be held in the hand and may sometimes be referred to as handheld electronic devices. If desired, the portable electronic devices may be somewhat larger devices such as laptop computers and tablet computers.

With one suitable arrangement the portable electronic devices may be compact media players. If desired, compact media players may be optimized to occupy a relatively small volume while maintaining desired functionality. For example, a compact media player may be designed to occupy a relatively small volume while maintaining a desired battery life, desired media playback qualities (e.g., sufficient volume and clarity of media playback operations), amount of media storage, as well as other desired user interface functions and functionality.

If desired, some or all of the control functions of the compact media player may be performed using accessories. This type of arrangement may help to reduce the size of the compact media player by reducing or even eliminating the number of control interfaces (e.g., buttons, sliders, etc.) located on the compact media player. With one suitable arrangement, the compact media player may connect with a headset through a connector and may receive control commands such as play, pause, stop, fast forward, skip forward, rewind, skip back, volume up, volume down, mute, and other control commands from the headset. In this arrangement, a headset may include speakers and a control unit that generates command signals that can be interpreted by the compact media player.

Figure 1:
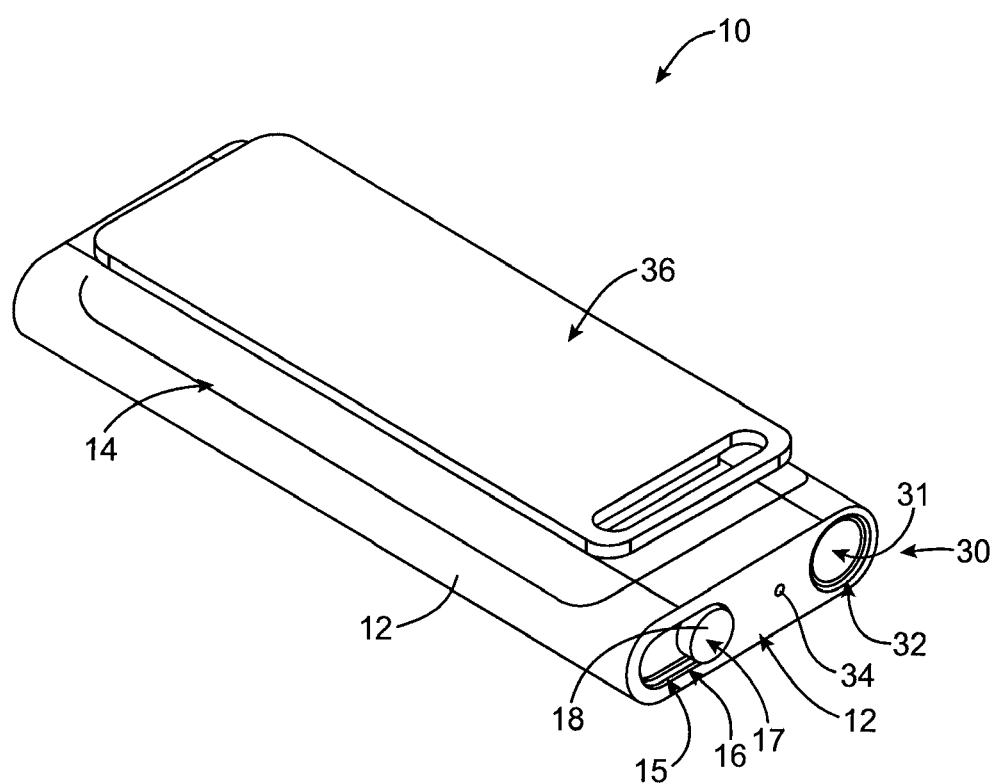
FIG. 1 is a perspective view of an illustrative portable electronic device in accordance with an embodiment of the present invention.

An illustrative portable electronic device in accordance with an embodiment of the present invention is shown in FIG. 1. Device 10 of FIG. 1 may be, for example, a compact handheld electronic device that supports media file playback functions. With one suitable arrangement, device 10 may be designed to be relatively compact. In this type of arrangement, the size of device 10 may be reduced by eliminating components such as a display or a transceiver and antenna combination. In general, however, device 10 may include wireless capabilities such as 2G and/or 3G cellular telephone and data functions, global positioning system capabilities, and local wireless communications functions (e.g., IEEE 802.11 and Bluetooth°). Device 10 may also include a display screen, if desired.

Device 10 may have a housing. Housing 12, which is sometimes referred to as a case, may be formed of any suitable materials including, plastic, glass, ceramics, metal, other suitable materials, or a combination of these materials. With one suitable arrangement, housing 12 (e.g., an elongated housing) may be formed from a combination of anodized aluminum and stainless steel. By forming housing 12 from a combination of anodized aluminum and stainless steel, the aesthetic appearance and the structural integrity of housing 12 may be improved. In addition, by forming housing 12 from a conductive material the housing may be used as a ground plane for grounding electrical components of device 10. If desired, portions of the anodized aluminum, which may be non-conductive, may be worn down to bare aluminum, which is typically conductive, to increase the electrical coupling of components to housing 12.

The material selected to form housing 12 generally depends on many factors including but not limited to strength (tensile), density (lightweight), strength to weight ratio, Young's modulus, corrosion resistance, formability, finishing, recyclability, tooling costs, design flexibility, manufacturing costs, manufacturing throughput, reproducibility, and/or the like. The material selected may also depend on electrical conductivity, thermal conductivity, combustibility, toxicity, and/or the like. The material selected may also depend on aesthetics including color, surface finish, weight, etc.

With one suitable arrangement, housing 12 may be formed from a metal material and, if desired, a machinable and recyclable metal material. For example, housing 12 may be formed from aluminum and stainless steel. Some of the reasons for using aluminum and stainless steel over other materials is that the combination of aluminum and stainless steel is light weight and structurally strong (e.g., it has very good mechanical properties and strength to weight ratio). This is especially important for compact portable devices. Other reasons for using aluminum and stainless steel may include: reduced tooling costs, its easily formable and extruded in a wide variety of shapes including hollow parts, easily machinable thus making it easy to alter the part and produce tight tolerances, provides a near net shape, offers superior corrosion resistance, it has high scrap value and is routinely reprocessed to generate new products, it can be finished using a variety of methods including mechanical and chemical prefinishes, anodic coatings, paints and electroplated finishes.

In one particular embodiment, housing 20 may be formed from a solid block or core of machined aluminum and stainless steel or other suitable metal. An advantage of forming housing 12 at least partly from aluminum is that aluminum is lightweight, machinable, durable and attractive in appearance. Aluminum may be anodized to form an insulating oxide coating.

Machining may be performed to achieve various effects in housing 12 such as a particular shape, a high degree of dimensional accuracy and surface finish in the shape of housing 12, openings in housing 12, structural features in housing 12 such as attachment features and internal areas, etc. The machining process may include one or more rough machining steps that remove a majority of material and then one or more fine machining steps to create the final shape. One or more computer numerical control (CNC) machine tools may be used to perform some or all of the machining operations.

Device 10 may have a housing structure 14 (e.g., a door 14). As shown in FIG. 1, structure 14 may fit into housing 12 and help to enclose the interior of housing 12. With one suitable arrangement, housing structure 14 may be formed from materials similar to housing 12. If desired, housing structure 14 may be formed using other suitable materials such as plastic, glass, ceramics, metal, or a combination of these and other materials. Housing 12 may be referred to as a front housing portion and housing structure 14 may be referred to as a rear housing portion.

Clip 36 may be pivotably coupled to structure 14. If desired, clip 36 may be used as a mounting clip. For example, a user of device 10 may slide clip 36 over a lapel, over the edge of a pocket, over a belt loop, or over any other suitable structure. Clip 36 may therefore hold device 10 to the structure. Clip 36 may also be referred to as a belt clip.

Device 10 may include an input-output device such as switch 18. Switch 18 may be, for example, a hold switch (button) that can be manipulated to place device 10 in a certain operating state. For example, switch 18 may have three positions illustrated by arrows 15, 16, and 17, respectively. When switch 18 is in the leftmost position (e.g., the position illustrated by arrow 15), device 10 may be turned off or may be in another low-power state such as a standby state to conserve power. When switch 18 is in the middle position (e.g., the position illustrated by arrow 16), device 10 may be operating in a continuous playback mode. When switch 18 is in the rightmost position (e.g., the position illustrated by arrow 17), device 10 may be operating in a shuffle playback mode. In the shuffle playback mode, device 10 may play back media files stored in internal storage in a random order. In the continuous playback mode, device 10 may play back media files in a predetermined order. Switch 18 may be a multi-position sliding switch that extends outwardly from the end face of housing 12 for actuation by a user.

Device 10 may include one or more indicator lights such as indicator light 34. Indicator light 34 may be used to display information about the status of device 10. For example, indicator light 34 may display a solid or flashing green light when device 10 is turned on (e.g., when switch 18 is moved from position 15 to position 16 or position 17). If desired, light 34 may display or flash a yellow light when battery levels in device 10 drop below a given threshold (e.g., when there is 10% battery charge remaining, when there are 30 minutes of battery life remaining, when the battery voltages drops below a certain threshold, etc.). With one suitable arrangement, light 34 may display or flash a red light when battery levels in device 10 drop below a second given threshold (e.g., a more critical threshold indicative of an almost fully discharged battery such as of battery charge or 5 minutes of battery life remaining).

If desired, indicator light 34 may continuously flash at given intervals or continuously display an appropriately colored light during normal operations (e.g., during media playback operations). With another suitable arrangement, light 34 may blink when device 10 is turned on, when the battery life of device 10 drops below one or more threshold levels, when device 10 changes media files as part of a media playback operation, at regular intervals, and at any combination of these and other times.

In general, indicator light 34 may also be used to display error messages and other messages. For example, a flashing red light 34 even when the battery of device 10 is fully charged may indicate that device 10 needs servicing. These examples are merely illustrative and, in general, indicator light 34 may display any suitable colors or patterns of colors to display desired information.

Device 10 may have connectors such as audio jacks and other connectors that can be used to convey signals into and out of device 10. As an example, device 10 may have a connector such as audio jack 30 (e.g., a female audio connector 30). Connector 30 may be used to convey audio signals from device 10 to an external headset accessory. For example, connector 30 may be used to convey left and right audio signals from device 10 to an external headset accessory with left and right speakers. Audio jack 30 may also be used to receive control signals. The control signals may include signals indicative of a user's desire to control a media playback operation. For example, the control signals may include media commands such as play, pause, fast forward, rewind, skip ahead and skip back (e.g., change tracks or media files), increase or decrease playback volume, mute, and other suitable commands. With one suitable arrangement, each of the control signals received by connector 30 may serve as the exclusive control signal for device 10. For example, a volume control, a mute control, a pause control, a play control, a fast forward and rewind control, and a skip track control received by connector 30 may each serve as the exclusive volume control, mute control, pause control, play control, fast forward and rewind control, and skip track control, respectively, for device 10 (e.g., device 10 may not have buttons for controlling volume, mute, pause, play, fast forward and rewind, and skip track operations).

Jack 30 may be used to convey data and power signals to device 10 (e.g., when device 10 is mounted in a dock, connected to a power supply, or connected to a computer). Jack 30 may also be used to convey data signals out of device 10. Jack 30 (e.g., connector 30) may be located within the housing 12 of device 10 and can be accessed through a hole 31 in the end face of the housing 12. For example, a male audio plug from an accessory may couple with connector 30 by passing through hole 31 of housing 12.

Audio jack 30 may include an insulator ring such as ring 32. Insulator ring 32 may extend into hole 31 of housing 12. Ring 32 may help to prevent a male connector from contacting housing 12 when the male connector is inserted into hole 31 of housing 12 (e.g., when the male connector is being coupled to or decoupled from connector 30). For example, the ring 32 may insulate the male connector form housing 12 when the male connector is being inserted into or removed from audio jack 30. The insulator ring 32 may be sub-flush from the outer surface of the housing 12. By mounting the insulator ring 32 sub-flush (e.g., below the outer surface of housing 12), the aesthetic appearance of device 10 may be improved. With one suitable arrangement, ring 32 may extend partway into the cavity of jack 30 (e.g., the interior diameter of ring 32 may be slightly less than the interior diameter of jack 30). With this type of arrangement, ring 32 may help to prevent audio plugs from bearing against the surface of housing 12 adjacent to jack 30. As one example, insulator ring 32 may be between an outermost contact of connector 30 and the exterior surface of housing 12.

Indicator light 34 and jack 30 are merely examples of input-out devices that may be used with electronic device 10. If desired, electronic device 10 may have other input-output devices. For example, device 10 may have a display screen, a touch screen, a click wheel button, a dock connector, on-off buttons or other buttons, additional input-output jacks, speakers, microphones, etc. The input-output arrangement of FIG. 1 is shown as an example.

Figure 2:
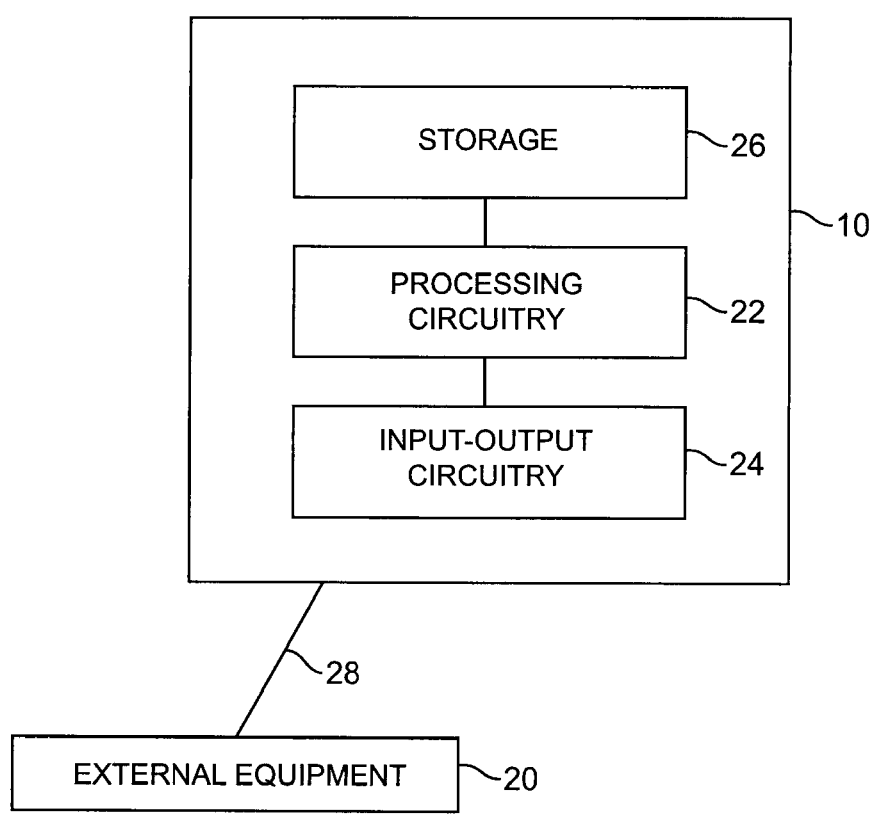
FIG. 2 is a schematic diagram of an illustrative portable electronic device in accordance with an embodiment of the present invention.

A schematic diagram of a portable electronic device such as handheld electronic device 10 of FIG. 1 is shown in FIG. 2. As shown in FIG. 2, device 10 may include storage 26. Storage 26 may include one or more different types of storage such as a solid state drive or other storage device that includes nonvolatile memory (e.g., flash memory or other electrically-programmable-read-only memory) or volatile memory (e.g., static or dynamic random-access-memory), hard disk drive storage, combinations of these and other types of storage, etc.

Processing circuitry 22 may be used to control the operation of device 10. Processing circuitry 22 may be based on a processor such as a microprocessor and other suitable integrated circuits. With one suitable arrangement, processing circuitry 22 and storage 26 may be used to run software on device 10, such as media playback applications. If desired, processing circuitry 22 and storage 26 may be used to run software on device 10 such internet browsing applications, voice-over-internet-protocol (VOIP) telephone call applications, email applications, operating system functions, etc.

Processing circuitry 22 and storage 26 may be used in implementing communications protocols such as serial and parallel bus communications protocols, universal serial bus (USB®) protocols, internet protocols, wireless local area network protocols, protocols for other short-range wireless communications links such as the Bluetooth° protocol, protocols for cellular telephone communications protocols, etc.

Input-output circuitry 24 may be used to allow data to be supplied to device 10 and to allow data to be provided from device 10 to external equipment 20. Indicator light 34 and jack 30 of FIG. 1 are example of input-output circuitry 24.

In general, input-output circuitry 24 can include user input-output devices such as buttons, touch screens, joysticks, click wheels, scrolling wheels, touch pads, key pads, keyboards, speakers, microphones, cameras, etc. A user can control the operation of device 10 by supplying commands through such user input devices. Display and audio devices within circuitry 24 may include liquid-crystal display (LCD) screens or other screens, light-emitting diodes (LEDs) such as LED 34 of FIG. 1, and other components that present visual information and status data. Audio-video interface equipment in circuitry 24 such as jacks (i.e., jack 30 of FIG. 1) and other connectors may be used to form connections with external headphones and monitors.

Input-output circuitry 24 may, if desired, include wireless communications circuitry such as radio-frequency (RF) transceiver circuitry formed from one or more integrated circuits, power amplifier circuitry, passive RF components, antennas, and other circuitry for handling RF wireless signals. Wireless signals can also be sent using light (e.g., using infrared communications).

Device 10 can communicate with external equipment 20 over paths such as path 28. Path 28 may include wired and wireless paths. External equipment 20 may include accessories such as headphones (e.g., a wired headset or audio headphones) and audio-video equipment (e.g., speakers, a game controller, or other equipment that receives and plays audio and video content), a peripheral such as a printer or camera, etc. External equipment 20 may also include equipment such as associated computing equipment that establishes a wired connection with device 10. A computer such as a personal computer may be included in external equipment 20 and may form a connection with device 10 using a connector such as connector 30 of FIG. 1, using a wireless link, or using any other suitable communications path.

Figure 3:
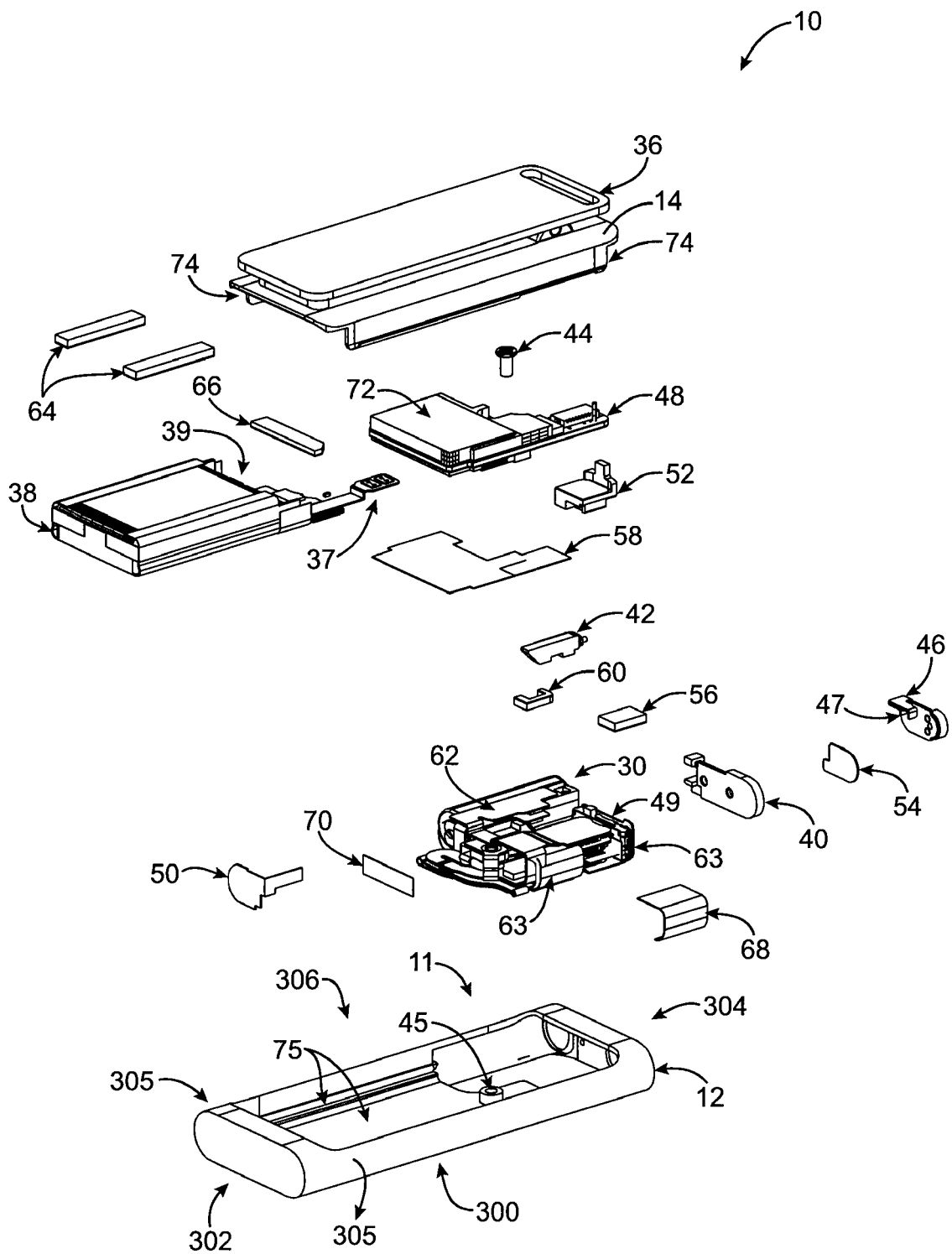
FIG. 3 is an exploded perspective view of an illustrative portable electronic device in accordance with an embodiment of the present invention.

An exploded perspective view of portable electronic device 10 is shown in FIG. 3. As shown in FIG. 3, device 10 may include a battery assembly 38, a circuit board assembly such as printed circuit board assembly 72, an audio jack assembly 62, and other components. Device 10 may have a housing formed from housing 12 and housing structure 14.

Battery assembly 38 may include any suitable type of battery. For example, battery assembly 38 may include a battery such as a carbon-zinc battery, an alkaline battery, a rechargeable alkaline battery, a lead-acid battery, a lithium-ion battery, a lithium-ion polymer battery, a nickel-cadmium battery, a nickel-iron battery, a nickel metal hydride battery, a nickel-zinc battery, a super charge ion battery, any other suitable type of battery, or a combination of these and other batteries. Battery assembly 38 may include one or more capacitors as power storage devices. If desired, battery assembly 38 may also include associated battery control circuitry sometimes referred to as battery protection circuits. Battery protections circuits can be used to ensure that the charge of a battery in battery assembly 38 remains within certain operating parameters (e.g., that the battery is not discharged below a certain level, charged above a certain level, or discharged or charged too quickly). With certain battery chemistries (e.g., lithium-ion batteries) battery protection circuits may be required to ensure safe operation of a battery.

Circuit board assembly 72 may include one or more printed circuit boards. As one example, circuit board assembly 72 may include storage and processing circuits such as storage 26 and processing circuitry 22 of FIG. 2.

Circuit board assembly 72 may also include battery control circuitry such as a battery protection circuit. With this type of arrangement, the battery protection circuit may be incorporated into circuit board assembly 72 which may allow circuit board assembly 72 and battery assembly 38 to fit together in a more compact space.

Circuit board support 52 may help to hold assembly 72 in a desired location. For example, support 52 may hold printed circuit board assembly 72 above audio jack assembly 62. With one suitable arrangement, support 52 may help to protect assembly 72 from excessive vibrations and, in particular, may help to protect the finger-like extension 48 of assembly 72. If desired, support 52 may also be used to bias against audio jack assembly 62. This type of arrangement may be used to apply pressure onto a grounding pin of the audio jack assembly 62 onto housing 12.

With one suitable arrangement, battery assembly 38 (e.g., battery 38) may include a ledge. As shown in FIG. 3, the ledge of assembly 38 is shown by arrow 39. With one suitable arrangement, the ledge of battery assembly 38 may be formed from a folded portion of a battery cell enclosure that is wrapped around battery cells in the assembly. The folded portion of the battery cell enclosure may include glue to seal the enclosure around the battery cells.

Printed circuit board assembly 72 may nest within the ledge 39 of battery assembly 38. Foam piece 66 may rest between the assembly 72 and ledge 39 of battery assembly 38.

Battery assembly 38 may also include power leads 37 that extend from the battery assembly 38. If desired, the power leads 37 may be formed from flexible circuits sometimes referred to as flex circuits. Power leads 37 may convey power signals and other signals between battery 38 and circuit boards 72. Leads 37 may be soldered to battery cells in battery assembly 38.

Housing 12 may include an opening 11 for receiving housing structure 14. When housing structure 14 is inserted into the opening 11 of housing 12, the top surface of housing structure 14 may be substantially flush with the top surface of housing 12 (e.g., the surface of housing 12 adjacent to the top surface of housing structure 14). The opening 11 in housing 12 may correspond to an internal void in housing 12 (e.g., a void between the interior surfaces of housing 12 and housing 14). The internal void 11 in housing 12 may be sized and proportioned receive components mounted in housing 12 such as battery assembly 38, printed circuit board assembly 72, and audio connector assembly 62. In general, the internal space 11 in housing 12 may be formed in any suitable size and shape.

With one suitable arrangement, housing 12 may have a substantially continuous surface having no openings (breaks or cracks) on a bottom surface 300 and a rear end 302 of the housing 12. For example, surface 300 and end 302 of housing 12 may each include a single surface devoid of openings for input-output devices such as playback controls and display screens. The top surface 306 of housing 12 may include an opening to which housing structure 14 can be mounted. Components mounted in the void 11 of housing 12 may pass through the opening in the top surface 306 of housing 12. Front end 304 may include openings for connector 30, switch 18, and indicator light 34, as examples. Sides 305 of housing 12 may be a continuous curved surface that are devoid of breaks and input-output components.

As shown in FIG. 3, housing structure 14 may include retaining clips 74. With one arrangement, structure 14 may include two clips 74 disposed on opposing sides of the structure 14. Each clip 74 may be nearly the full length of the structure 14. When the structure 14 is secured to housing 12, each clip 74 may mate with a corresponding ridge or mating structure 75 in housing 12. With one suitable arrangement, the clips 74 may bias structure 14 to a subflush position relative to housing 12 while pieces 64 and 56 (e.g., foam or sponge pieces in device 10) bear against internal components such as battery assembly 38 and printed circuit board assembly 72 to bias structure 14 into a flush position relative to housing 12 (e.g., so that the edges of structure 14 are flush with the edges of housing 12 and create a smooth appearance and feel around the external interface between structure 14 and housing 12). Clips 7a4 may be used to attach housing structure 14 to housing 12.

Audio jack assembly 62 may include audio jack 30. In particular, audio jack assembly 62 may include audio jack 30, a flex circuit 63 that couples audio jack 30 to a printed circuit board in assembly 72, and a switch receptor 49 corresponding to switch 18 of FIG. 1. If desired, the flex circuit 63 in assembly 62 may be folded to fit within the confines of housing 12. Insulator 58 may be placed between audio jack assembly 62 and printed circuit board assembly 72. Insulator 68 may cover flex circuit 63. Insulators 58 and 68 may help to protect assembly 72, audio jack assembly 62, and the flex circuit 63 from shorting to housing 12. If desired, insulators 58 and 68 may be formed from a polyimide film such as a Kapton° tape.

Bracket 40, label 54, hold switch 46 (e.g., button member 46), and the switch receptor 49 may form an electromechanical switch such as hold switch 18. With one suitable arrangement, bracket 40, label 54, hold switch 46, and switch 49 may be glued together and/or may mechanically snap together when assembled into housing 12 to form hold switch 18. When assembled, tab 47 of switch 46 may complete an electrical connection to a portion of switch 49. As one example, tab 47 (e.g., protruding arm 47) may extend past bracket 40 into switch mechanism 49. If desired, hold switch 18 may be formed using another suitable arrangement. Tape 70 may be used to cover portions of hold switch 18 (e.g., bracket 40, label 54, receptor 49, and switch 46) and protect those portions from dust.

Audio jack assembly 62 may include light pipe 42 and light shield 60. Light pipe 42 may redirect light from an LED or other light source in audio jack assembly 62 (or may itself include a suitable light source) to the exterior of housing 12. With this type of arrangement, the light source for indicator light 34 does not have to be directly behind the location of indicator light 34 on housing 12. Light shield 60 may help to prevent light from the light source for indicator 34 from escaping into the interior of device 10 and then out through audio jack 30, hold switching 17, or the interface between housing 12 and structure 14, as examples.

A water sensitive material may also be included in device 10 to indicate to a user if water has entered device 10. For example, a patch of water sensitive material such as water dot 50 may be placed at the end of audio jack 30. With this type of arrangement, a user may look down the barrel of audio jack 30 to see the water dot 50 and determine if water has infiltrated the interior of device 10. If desired, water dot 50 may be located in another location and, if desired, additional water dot indicators may be included in device 10.

With one suitable arrangement, printed circuit board assembly 72 and audio jack assembly 62 may be held to housing 12 by screw 44. With this type of arrangement, screw 44 may pass through assemblies 72 and 62 and may be screwed into a mounting structure 45 in housing 12. Battery assembly 38 may be held to housing 12 by one or more screws, by an adhesive, and/or by pressure between housing 12 and housing structure 14, as examples.

Figure 4:
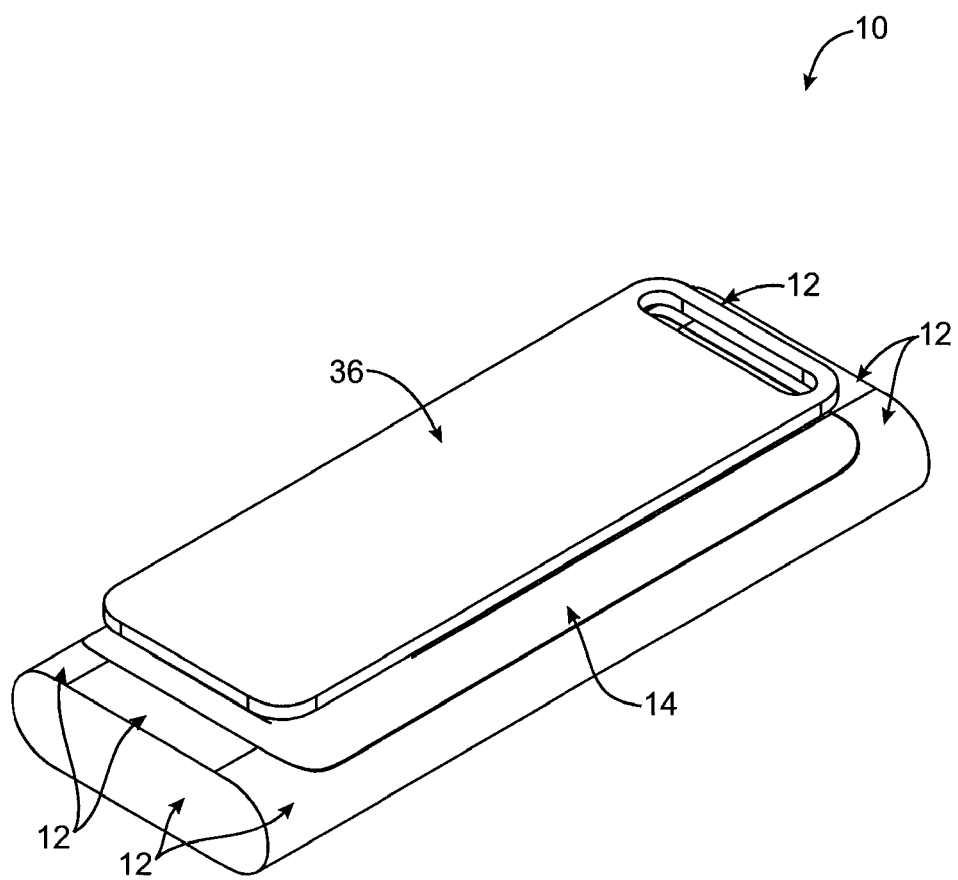
FIG. 4 is a perspective view of the illustrative portable electronic device of FIG. 1 in accordance with an embodiment of the present invention.

Another view of device 10 is shown in FIG. 4. Specifically, FIG. 4 shows a view of device 10 which details one potential way in which housing structure 14 and housing 12 may be formed.

Figure 5:
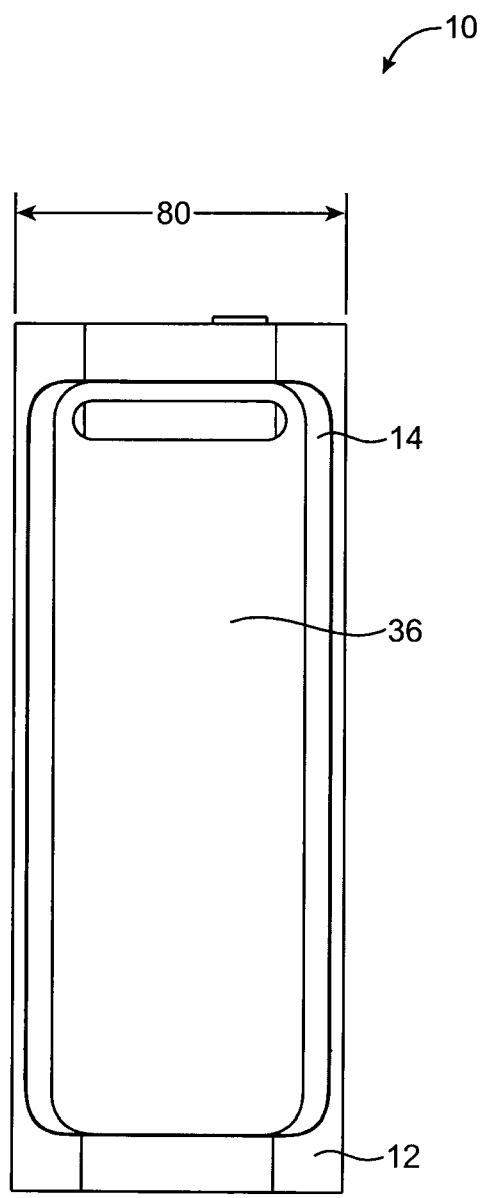
FIG. 5 is a top view of the illustrative portable electronic device of FIG. 1 in accordance with an embodiment of the present invention.
Figure 6:
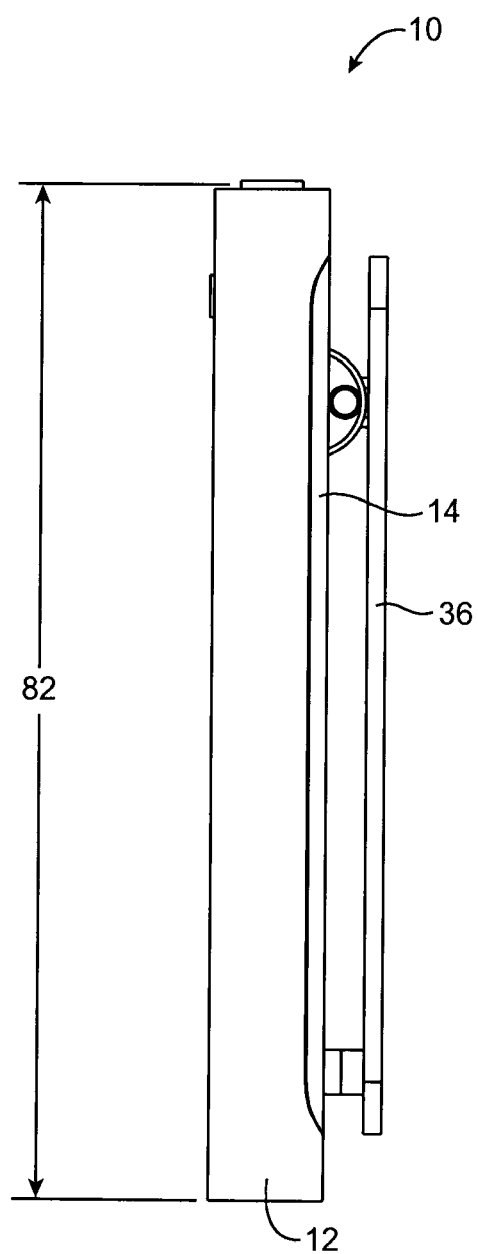
FIG. 6 is a side view of the illustrative portable electronic device of FIG. 1 in accordance with an embodiment of the present invention.
Figure 7:
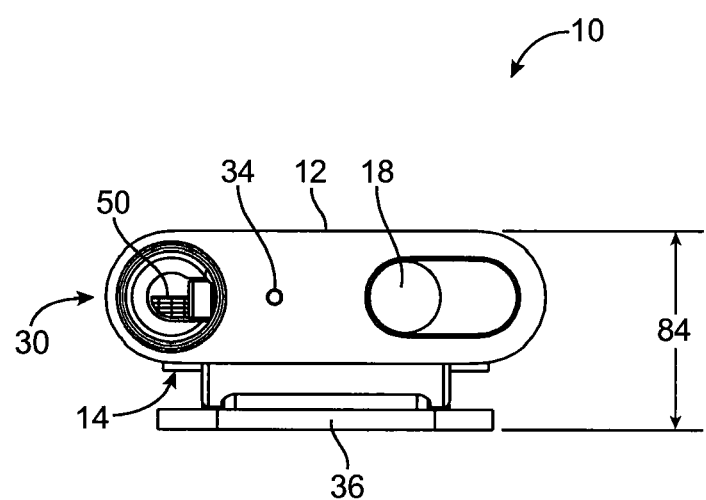
FIG. 7 is a front view of the illustrative portable electronic device of FIG. 1 in accordance with an embodiment of the present invention.

FIGS. 5, 6, and 7 show device 10 of FIG. 1 as a top view, a side view, and a front view, respectively. As shown in FIG. 5, device 10 may have a width of approximately 17.5 mm as illustrated by arrows 80. As shown in FIG. 6, device 10 may have a length of approximately 45.4 mm (including the hold switch 18 of FIG. 1) as illustrated by arrows 82. As shown in FIG. 7, device 10 may have a height of approximately 7.8 mm as illustrated by arrows 84. If desired, device 10 may have a length of 46.0 mm or more, 46.0 mm or less, 45.4 mm, 45.4 mm or less, 40 mm or less, etc. Device 10 may have a width of 18.0 mm or more, 18.0 mm or less, 17.5 mm, 17.5 mm or less, 16 mm or less, etc. Device 10 may have a height of 8.0 mm or more, 8.0 mm or less, 7.8 mm, 7.8 mm or less, 7.0 mm or less, etc. These dimensions of device 10 are merely illustrative and, if desired, device 10 may be formed to have other suitable dimensions. FIG. 7 also shows how a user could see water dot 50 through the barrel of audio jack 30 as described in connection with FIG. 3.

Figure 8:
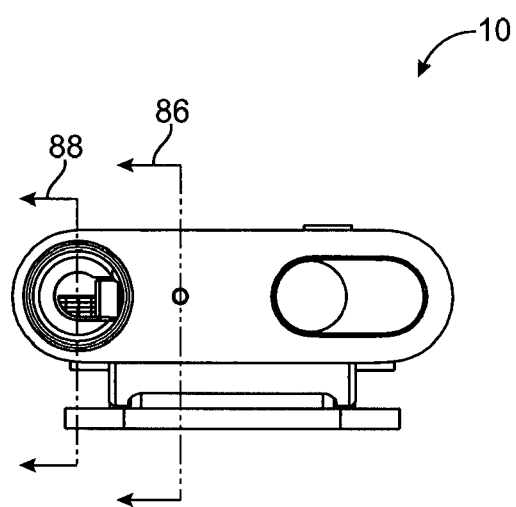
FIG. 8 is a front view of the illustrative portable electronic device of FIG. 1 that shows the positions of two cross-sections of the portable electronic device in accordance with an embodiment of the present invention.

FIG. 8 is a front view of portable device 10 that shows the location of various cross-sections of device 10. In particular, FIG. 8 illustrates the locations of cross-section 86 which is shown in FIG. 9 and cross-section 88 which is shown in FIG. 10.

Figure 9:
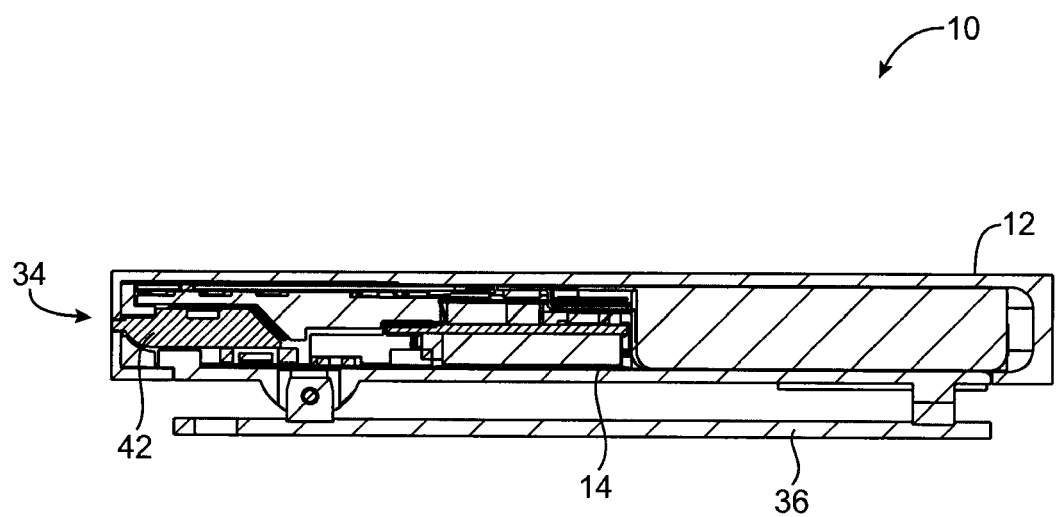
FIG. 9 is a cross-sectional view of the illustrative portable electronic device of FIG. 1 through a first line illustrated in FIG. 8 in accordance with an embodiment of the present invention.

In the cross-sectional view of FIG. 9, the position of light pipe 42 relative to housing 12 is shown. In particular, FIG. 9 illustrates that light pipe 42 may be substantially flush with the surrounding surface of housing 12 (e.g., to form status indicator 34).

Figure 10:
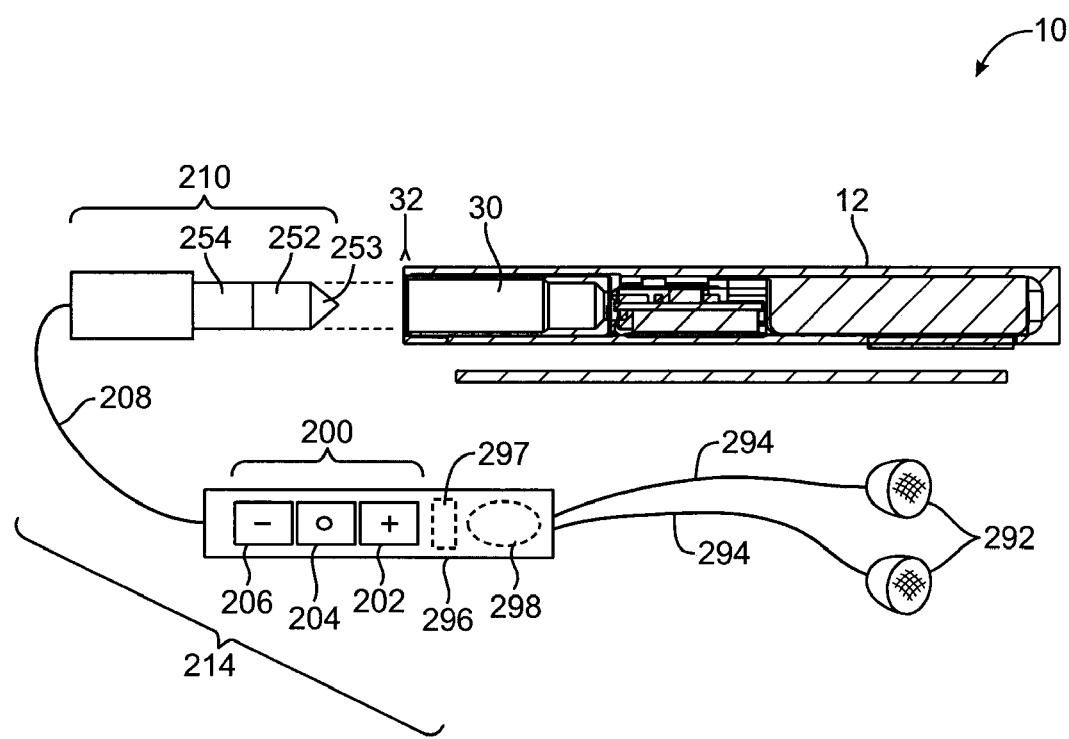
FIG. 10 is a cross-sectional view of the illustrative portable electronic device of FIG. 1 through a second line illustrated in FIG. 8 and a partly schematic view of an illustrative accessory such as a headset that may be provided with a user input interface such as input-output circuitry containing multiple user-selectable buttons in accordance with an embodiment of the present invention.

In the cross-section view of FIG. 10, the positions of audio jack 30 and insulator ring 32 relative to housing 12 are shown. With one suitable arrangement which is illustrated in FIG. 10, audio jack 30 may be mounted approximately 0.2 mm sub-flush relative to housing 12. For example, the audio jack 30 may extend from within device 10 to 0.2 mm below the surface of housing 12. With one suitable arrangement, insulator ring 32 may also be mounted 0.2 mm sub-flush relative to housing 12.

An illustrative accessory is also shown in FIG. 10. Accessory 214 of FIG. 10 may be a headset with two speakers. Speakers 292 may be provided in the form of over-the-ear speakers, ear plugs, or ear buds (as examples) Dual-conductor wires such as wires 294 may be used to connect speakers 292 to user interface main unit 296. Optionally, unit 296 may include a microphone 298. In some applications, microphone 298 may not be needed and may therefore be omitted from accessory 214 to lower cost. In other applications, such as cellular telephone applications, voice recording applications, etc., microphone 298 may be used to gather audio signals (e.g., from the sound of a user's voice).

Unit 296 may include user input devices such as user input interface 200. In the FIG. 10 example, unit 296 includes three buttons. If desired, more buttons, fewer buttons, or non-button user input devices may be included in accessory 214. Moreover, it is not necessary for these devices to be mounted to the same unit as optional microphone 298. The FIG. 10 arrangement is merely illustrative. If desired, unit 296 may be connected within one of the branch paths 294, rather than at the junction between path 208 and paths 294. This may help position a microphone within unit 296 closer to the mouth of a user, so that voice signals can be captured accurately.

In an illustrative three-button arrangement, a first of the three buttons such as button 202 may be pressed by a user when it is desired to advance among tracks being played back by a music application or may be used to increase a volume setting. A second of the three buttons, such as button 204 may be pressed when it is desired to stop music playback, resume music playback, or perform another function such as make a menu selection. A third of the three buttons such as button 206 may be selected when it is desired to move to an earlier track or when it is desired to lower a volume setting. Multiple clicks, click and hold operations, and other user input patterns may also be used. The up/down volume, forward/reverse track, and play/pause examples described in connection with FIG. 10 are merely illustrative. In general, the action that is taken in response to a given command may be adjusted by a system designer through modification of the software in device 10.

As shown in FIG. 10, a cable such as cable 208 may be integrated into accessory 214. At its far end, cable 208 may be provided with a connector such as audio connector 210. In the FIG. 10 example, accessory 214 has two speakers 292. Connector 210 may therefore be of the three-contact variety (e.g., connector 210 may have tip contact 253, ring contact 252, and sleeve contact 254). In embodiments in which accessory 214 also includes optional microphone 298, connector 210 may be of the four-contact variety. If desired, connectors with additional contacts may be used (e.g., to carry auxiliary power, to carry control signals, etc.). Audio connectors with optical cores can be used to carry optical signals in addition to analog electrical signals.

Accessory 214 may be provided with circuitry that helps convey signals from user input interface 200 to device 10 over path 208 (e.g., path 28 of FIG. 2). In general, any suitable communications format may be used to convey signals (e.g., analog, digital, mixed arrangements based on both analog and digital formats, optical, electrical, etc.). These signals may be conveyed on any suitable lines in path 208. To avoid the need to provide extra conductive lines in path 208 and to ensure that accessory 214 is as compatible as possible with standard audio jacks, it may be advantageous to convey signals over existing lines and associated audio connector terminals (e.g., speaker lines and ground). In particular, it may be advantageous to use one of the speaker lines and a ground line (e.g., the lines connected to contacts such as sleeve contact 254, ring contact 252, and tip contact 253 in audio plug 210 of FIG. 10) to convey signals such as user input signals and control signals between accessory 214 and electronic device 10.

With one suitable communications arrangement, buttons such as buttons 202, 204, and 206 may be encoded using different resistances. When a user presses a given button, device 10 can measure the resistance of user input interface 200 over the speaker and ground lines and can thereby determine which button was pressed. With another suitable arrangement, a button may be provided that temporarily shorts one of the speaker lines to the ground wire in cable 208 together when pressed. Electronic device 10 can detect this type of momentary short. Button presses within interface 200 may be converted to ultrasonic tones or other control signals that are conveyed over the speaker and ground lines. Electronic device 10 can detect and process the ultrasonic tones or other control signals without interrupting audio playback operations.

If desired, electronic device 10 can support communications using two or more of these approaches. Different approaches may be used, for example, to support both legacy hardware and new hardware, to support different types of software applications, to support reduced power operation in certain device operating modes, etc.

Ultrasonic tones lie above hearing range for human hearing (generally considered to be about 20,000 Hz). In a typical arrangement, the ultrasonic tones might fall within the range of 75 kHz to 300 kHz (as an example). Ultrasonic tones at frequencies of less than 75 kHz may be used, but may require more accurate circuitry to filter from normal microphone audio signals. Ultrasonic tones above 300 kHz may become susceptible to noise, because the conductors in many headset cables are not designed to handle high-frequency signals. The cables can be provided with shielding and other structures that allow high speed signaling to be supported, or, more typically, lower tone frequencies may be used.

Ultrasonic tones may be formed using any suitable oscillating waveform such as a sine wave, saw (triangle) wave, square wave, etc. An advantage of saw and sine waves is that these waveforms contain a narrower range of harmonics than, for example, square waves. As a result, ultrasonic tones based on sine or saw waves may exhibit relatively narrow bandwidth. This may simplify detection and reduce the likelihood of audio interference.

Ultrasonic tones will not be audible to human hearing and therefore represent a form of out-of-band transmission. Arrangements that rely on ultrasonic tones in this way can avoid undesirable audible pops and clicks that might otherwise be associated with a button arrangement that momentarily shorts a speaker line and a ground line together upon depression of a button and thereby momentarily disrupts normal operation of the speaker signal path.

In configurations in which a speaker line and a ground are shorted together upon button actuation events, it will generally not be possible to transmit audio information such as audio signals while the speaker and ground line are shorted. An advantage of using devices that do not short the speaker and ground lines together such as devices that use ultrasonic tones to convey button actuation information (and that may therefore omit shorting switches between the speaker and ground lines) is that this allows audio information such as audio signals to be transmitted to accessory 214 in a continuous uninterrupted fashion. Even if a user is currently listening to a media playback operation, the user may press buttons that are ultrasonically encoded without interrupting the media playback operation. Each time a button is pressed, the button press event results in the transmission of a corresponding ultrasonic tone, but does not short the speaker and ground lines.

Circuitry 297 may be provided within accessory 214 (e.g., within main unit 296) to handle operations associated with communicating between accessory 214 and device 10. For example, circuitry 297 may transmit ultrasonic tones to device 10 and may receive signals from device 10. If desired, circuitry 297 may take the form of an adapter (e.g., main unit 296 and circuitry 297 may be an adapter through which a headphone accessory can connect to device 10). Device 10 may also include circuitry (shown as circuitry 297 in FIG. 10) to receive and decode ultrasonic tones from accessory 214 and to send signals to accessory 214.

Figure 11:
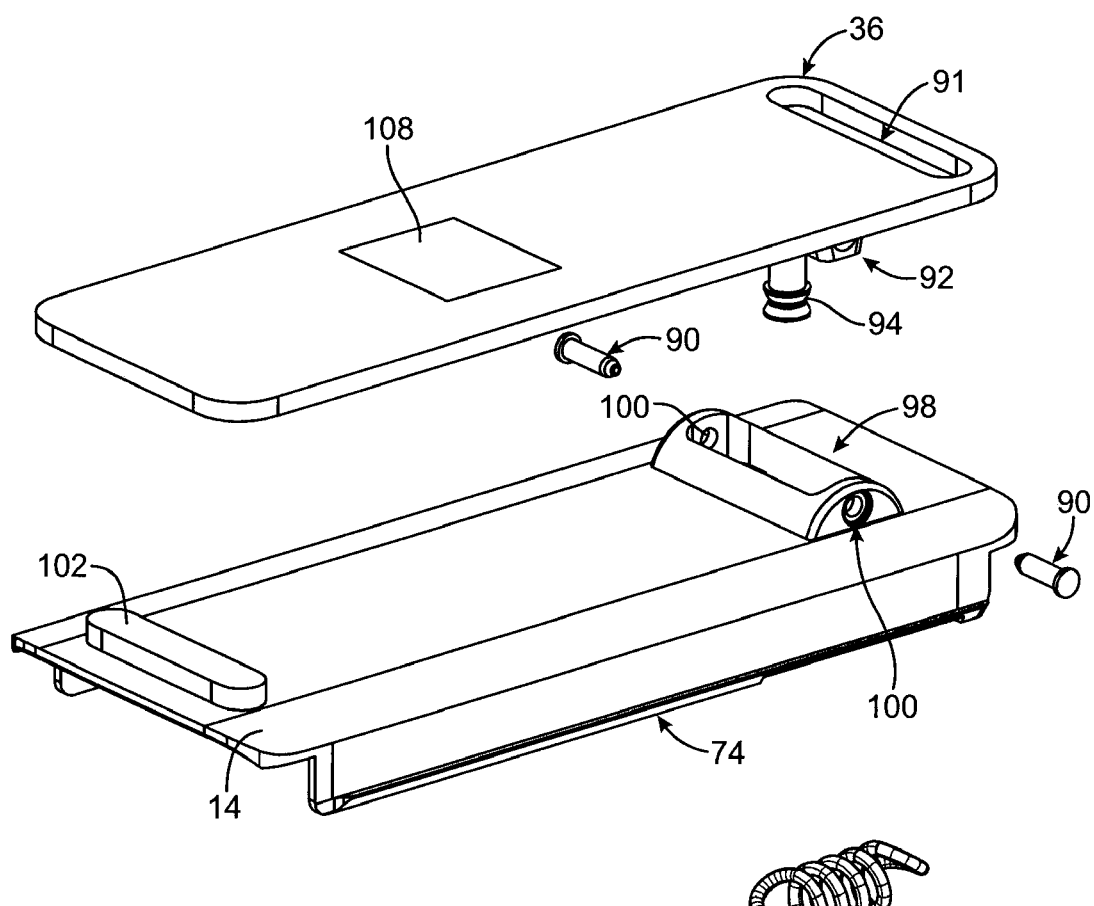
FIG. 11 is an exploded perspective view of an illustrative door and clip assembly that may be part of a portable electronic device in accordance with an embodiment of the present invention.

FIG. 11 illustrates an exploded perspective view of housing structure 14 and clip 36. As shown in FIG. 11, clip 36 may include a post 94 and mounting holes 92. Clip 36 may also include a hole 91 through which accessories such as a leash can be attached to device 10. Clip 36 may pivot around structure 98 (e.g., pivot structure 98) of housing structure 14. Clip 36 may be pivotably mounted to the housing structure 14.

Clip 36 may be coupled to housing structure 14 by pins 90. Each pin 90 may fit through a respective hole 100 in structure 98 and into a respective hole 92 in housing structure 14. With one suitable arrangement, the pins 90 may be press fit into the holes 92. With this type of arrangement, the pins 90 may be slightly larger than the holes 92 such that when the pins 90 are pressed into the holes 92 the pins 90 remain firmly wedged in the holes 92.

When clip 36 is attached to housing structure 14, spring 96 may be attached to post 94 of clip 36 and a respective post on housing structure 14 (not shown in FIG. 11). With one suitable arrangement, spring 96 may bias clip 36 against bar 102 during normal operations (e.g., spring 96 may hold clip 36 closed when a user is not pressing on clip 36). A user may open clip 36 by pressing against clip 36 in the region of hole 91 or by lifting the end of the clip above bar 102.

If desired, the outside face of clip 36 may include a label 108. Label 108 may be a logo or other suitable label. Label 108 may be formed on clip 36 using any suitable technique such as laser etching, a sticker, screen printing, paint, mechanical etching, etc. With one suitable arrangement, label 108 may be a laser etched rendering of a brand icon.

Figure 12:
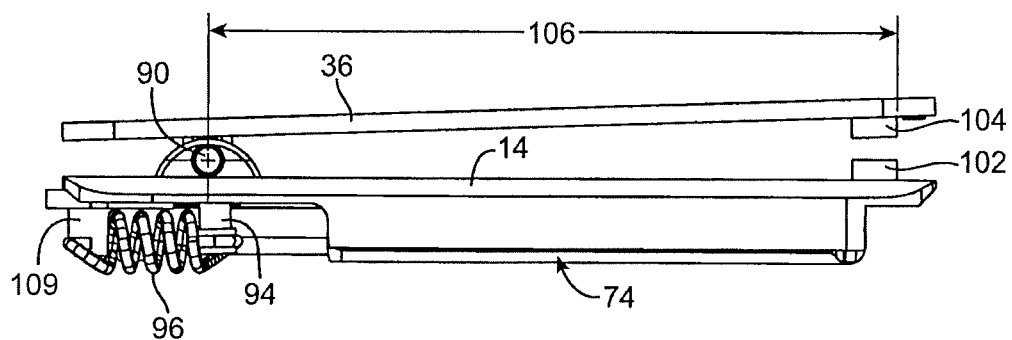
FIG. 12 is a side view of an illustrative door and clip assembly that may be a part of a portable electronic device in accordance with an embodiment of the present invention.

A side view of clip 36 and housing structure 14 assembled together is shown in FIG. 12. As shown in FIG. 12, spring 96 may be coupled to post 94 of clip 36 and post 109 of housing structure 14. Also, clip 36 may include a bar 104 that rests against bar 102 of housing structure 14 when the clip is closed, which is the position shown in FIG. 13. As illustrated in FIG. 12, clip 36 may have a length from the pivot point around pins 90 to bar 104 of approximately 30.9 mm as illustrated by arrows 106. The portion of clip 74 shown in FIG. 12 is cutaway around spring 96 to show spring 96 and the posts to which the spring is attached.

Figure 13:
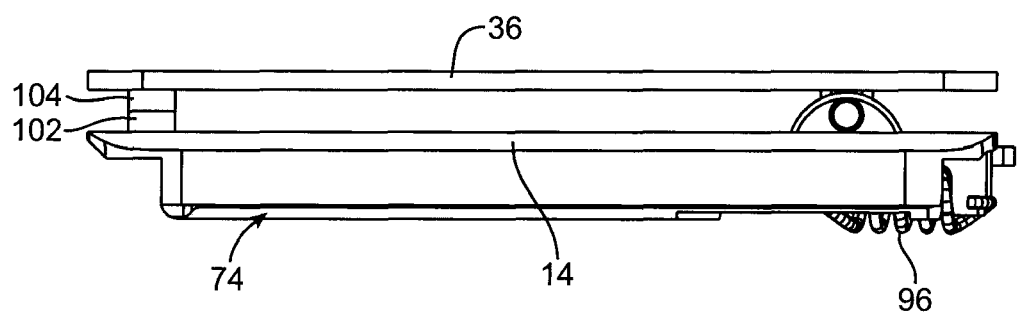
FIG. 13 is a side view of an illustrative door and clip assembly in which the door may include retaining clips that run along a majority of the length of the door in accordance with an embodiment of the present invention.

As shown in FIG. 13, spring 96 may bias bar 104 against bar 102 during normal operation. FIG. 13 also illustrates that each clip 74 may extend along most of the length of housing structure 14.

Figure 14:
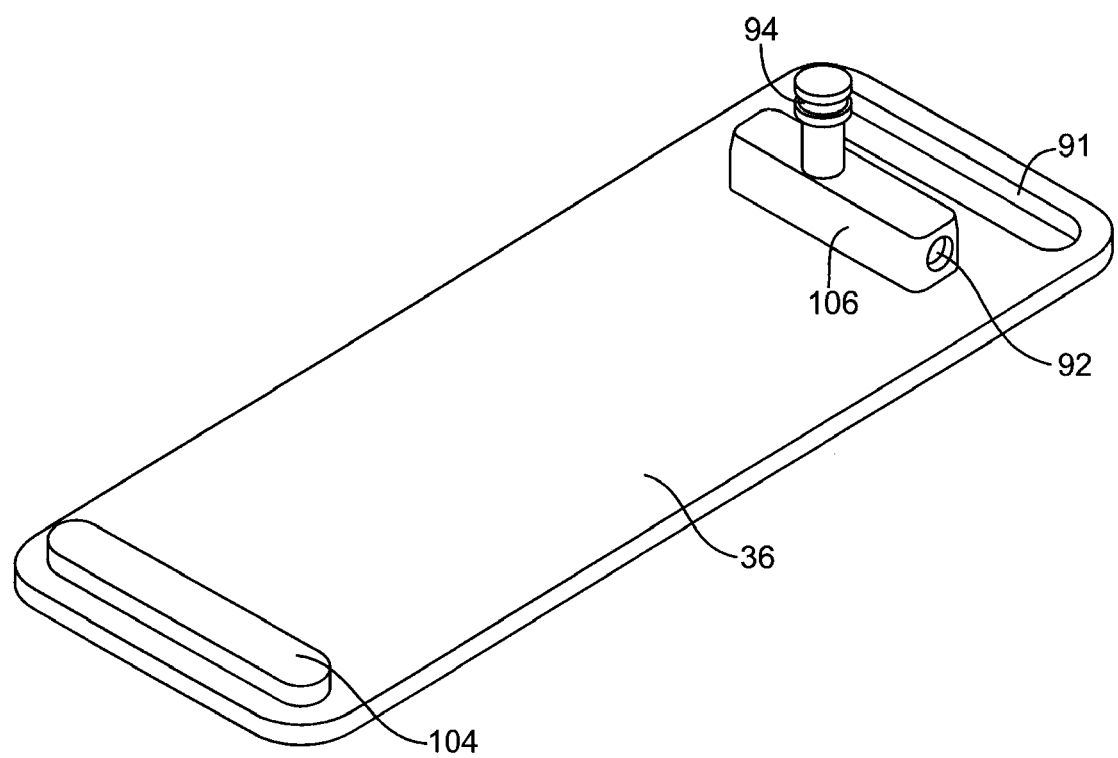
FIG. 14 is a perspective view of an illustrative clip assembly in accordance with an embodiment of the present invention.

FIG. 14 illustrates the underside of clip 36. As shown in FIG. 14, clip 36 may include a bar 106 on which post 94 may be mounted. Holes 92 may be formed in the sides of post 94. This is merely one suitable arrangement for clip 36 and, in general, clip 36 may be formed using any suitable arrangement and shape.

Figure 15:
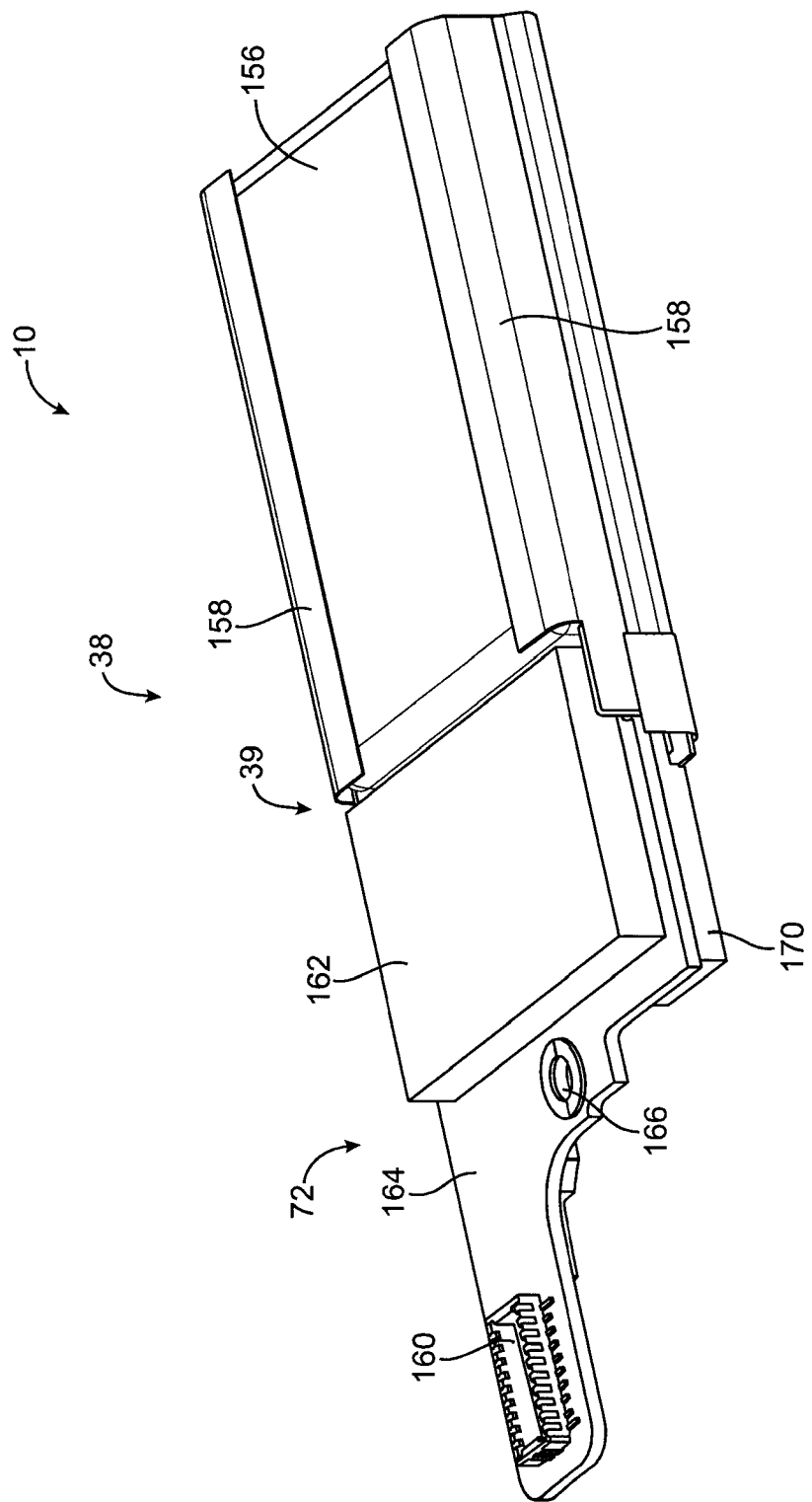
FIG. 15 is a perspective view of an illustrative printed circuit board and battery that may be nested together in a portable electronic device in accordance with an embodiment of the present invention.

A perspective view of printed circuit board assembly 72 and battery assembly 38 nested together is shown in FIG. 15. FIG. 15 illustrates one potential way in which assemblies 38 and 72 may be nested together when assembled in device 10. As shown in FIG. 15, printed circuit board assembly 72 may be nested within ledge 39 of battery assembly 38. Assemblies 38 and 72 may be mounted to housing 12 by screw 44 of FIG. 3 which may pass through hole 166 in assembly 72. Typically, safety circuitry for a battery assembly is contained within the battery assembly. If desired, safety circuitry for battery assembly 38 may be located in circuit board assembly 72. With this type of arrangement, space in battery assembly 38 that would otherwise be devoted to the safety circuitry can be utilized in nesting assemblies 38 and 72 together (e.g., by placing safety circuitry in assembly 72, assemblies 38 and 72 may occupy a smaller volume than if the safety circuitry were located in assembly 38).

Battery assembly 38 may include one or more battery cells 156 and structure 158. Battery cells 156 may be based on any suitable battery technology such as a rechargeable alkaline battery, a lithium-ion battery, a lithium-polymer battery, etc. Structure 158 may provide assembly 38 with structural integrity and/or may serve to insulate battery cells 156 (e.g., to protect cells 156 from electrically grounding to housing 12). With one suitable arrangement, structure 158 may be formed from a polyimide film such as a Kapton° tape that is wrapped partially or wholly around cells 156. Tape 158 may electrically shield cells 156 from nearby conductive material such as housing 12, connector assembly 62, and assembly 72.

Printed circuit board assembly 72 may include circuitry 162, circuitry 170, and connector 160 mounted on a substrate 164. With one suitable arrangement, circuitry 162 may include storage such as storage 26 of FIG. 2 and/or storage 126 of FIG. 17, circuitry 170 may include processing circuitry 22 and input-output circuitry 24 of FIG. 2 and/or transceiver circuitry 120 and processing circuitry 128 of FIG. 17. As an example, circuitry 162 may include nonvolatile memory and circuitry 170 may include a processor and other circuit components in device 10.

Connector 160 may be any suitable type of connector. With one suitable arrangement, connector 160 may couple to connector assembly 62 (e.g., audio jack assembly 62) through a flexible circuit. Connector 160 may convey audio and data signals between assemblies 72 and 62, if desired.

Substrate 164 may be a printed circuit board substrate. If desired, circuit interconnects may be routed through substrate 164 (e.g., through vias and other interconnection structures). Substrate 164 may be formed from a flexible material such that assembly 72 may be a flexible circuit assembly.

Figure 16:
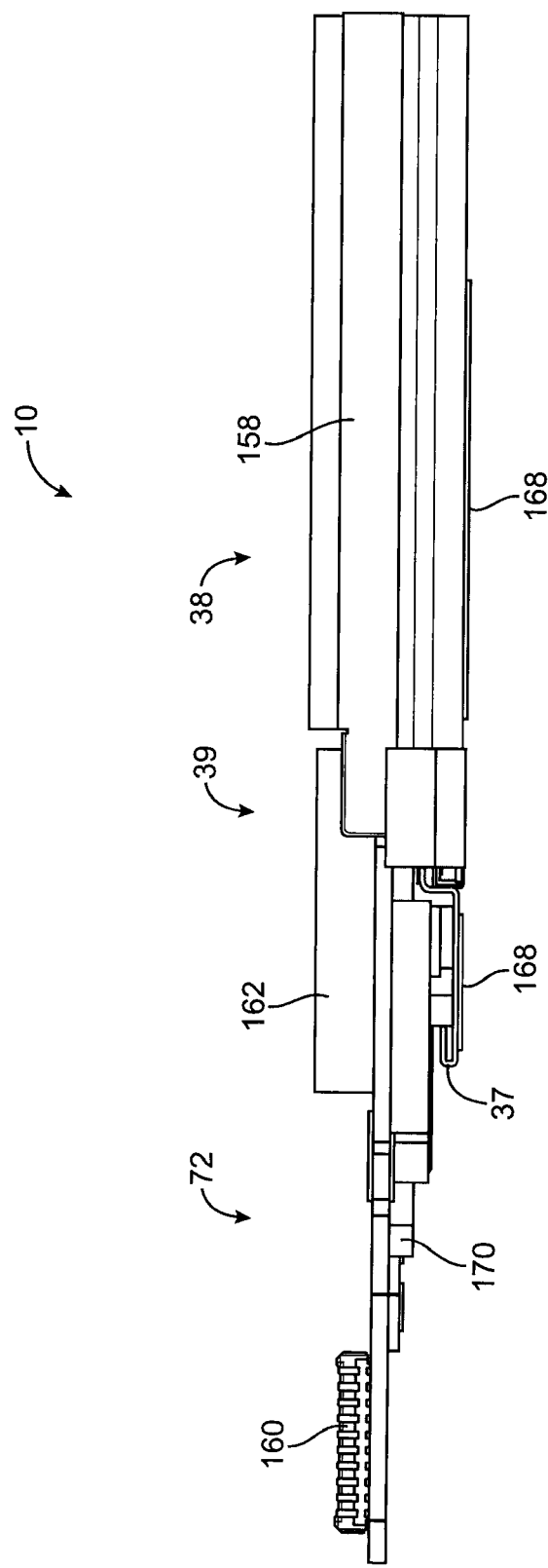
FIG. 16 is a side view of the illustrative printed circuit board and battery assembly of FIG. 15 in accordance with an embodiment of the present invention.

A side view of assemblies 38 and 72 is shown in FIG. 16. As shown in FIG. 16, printed circuit board assembly 72 may be electrically coupled to battery assembly 38 through circuit 37 (e.g., power leads 37). As one example, circuit 37 may convey positive and negative power signals between battery cells 156 of assembly 38 and circuitry 170 of assembly 72. If desired, circuit 37 may convey positive and negative power signals for each of the battery cells 156. This type of arrangement may be particularly useful when safety circuitry for cells 156 is incorporated into circuitry 170 so that circuitry 170 can monitor the voltages across each of the cells 156. If desired, circuit 37 may be a flex circuit.

With one suitable arrangement, an adhesive material may be used in mounting assemblies 38 and 72 to housing 12. For example, a relatively thin film of adhesive material 168 may be used to secure assemblies 38 and 72 to housing 12. If desired, adhesive material 168 may be formed from a double-sided tape or from another type of adhesive. As shown in FIG. 16, material 168 may be located underneath battery assembly 38, circuit 37, and circuitry 170. This is merely an example and, in general, adhesive 168 may be located wherever desired.

Figure 17:
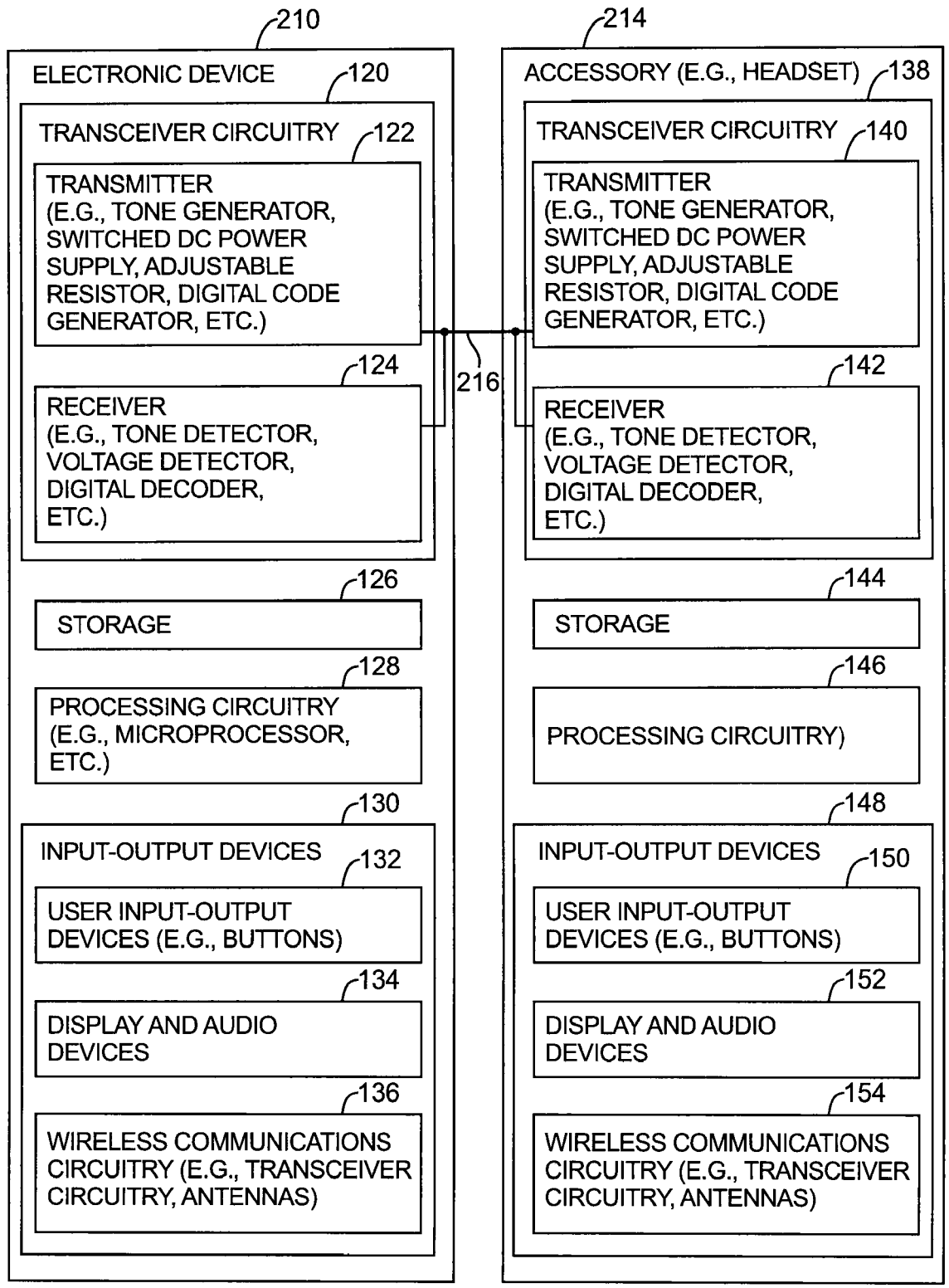
FIG. 17 is a schematic diagram showing illustrative circuitry that may be used in an electronic device and an associated accessory in accordance with embodiments of the present invention.

A generalized diagram of an illustrative electronic device 210 and accessory 214 is shown in FIG. 17. In the FIG. 17 example, device 210 and accessory 214 are shown as possibly including numerous components for supporting communications and processing functions. If desired, some of these components may be omitted, thereby reducing device cost and complexity. The inclusion of these components in the schematic diagram of FIG. 17 is merely illustrative.

Device 210 may be, for example, computing equipment such as a compact media player. Device 210 may optionally support cellular telephone and data functions, global positioning system capabilities, and local wireless communications capabilities (e.g., IEEE 802.11 and Bluetooth°), handheld computing device functions such as internet browsing, email and calendar functions, games, music player functionality, etc. With one suitable arrangement, electronic device 10 of FIG. 1 may be implemented using the arrangement of FIG. 17 (e.g., electronic device 210 may serve as device 10).

Accessory 214 may be, for example, a headset with or without a microphone, a set of stand-alone speakers, audio-visual equipment, an adapter, an external controller (e.g., a keypad), or any other suitable device that may be connected to device 210. Path 216 may include paths such as path 28 of FIG. 2 and audio connectors such as connector 30 of FIG. 1 or other suitable connectors.

As shown in FIG. 17, device 210 and accessory 214 may include storage 126 and 144. Storage 126 and 144 may include one or more different types of storage such as hard disk drive storage, nonvolatile memory (e.g., flash memory or other electrically-programmable-read-only memory), volatile memory (e.g., static or dynamic random-access-memory), etc.

Processing circuitry 128 and 146 may be used to control the operation of device 210 and accessory 214. Processing circuitry 128 and 146 may be based on processors such as microprocessors and other suitable integrated circuits. These circuits may include application-specific integrated circuits, audio codecs, video codecs, amplifiers, communications interfaces, power management units, power supply circuits, circuits that control the operation of wireless circuitry, radio-frequency amplifiers, digital signal processors, analog-to-digital converters, digital-to-analog converters, or any other suitable circuitry.

With one suitable arrangement, processing circuitry 128 and 146 and storage 126 and 144 are used to run software on device 210 and accessory 214. The complexity of the applications that are implemented depends on the needs of a system designer. For example, the software may support complex functionality such as internet browsing applications, voice-over-internet-protocol (VOIP) telephone call applications, email applications, media playback applications, operating system functions, and less complex functionality such as the functionality involved in encoding button presses as ultrasonic tones. To support communications over path 216 and to support communications with external equipment such as equipment 20 of FIG. 2, processing circuitry 128 and 146 and storage 126 and 144 may be used in implementing suitable communications protocols. Communications protocols that may be implemented using processing circuitry 128 and 146 and storage 126 and 144 include internet protocols, wireless local area network protocols (e.g., IEEE 802.11 protocols—sometimes referred to as Wi-Fi®), protocols for other short-range wireless communications links such as the Bluetooth° protocol, protocols for handling 3G communications services (e.g., using wide band code division multiple access techniques), 2G cellular telephone communications protocols, serial and parallel bus protocols, etc. In a typical arrangement, more complex functions such as wireless functions and media playback operations are implemented exclusively or primarily on device 210 rather than accessory 214, but accessory 214 may also be provided with some or all of these capabilities, if desired.

Input-output devices 130 and 148 may be used to allow data to be supplied to device 210 and accessory 214 and may be used to allow data to be provided from device 210 and accessory 214 to external destinations. Input-output devices 130 and 148 can include devices such as buttons, non-touch displays, and touch displays (e.g., based on capacitive touch or resistive touch technologies as examples). Visual information may also be displayed using light-emitting diodes and other lights. Input-output devices 130 and 148 may include one or more buttons.

Buttons and button-like devices may include hold switches, keys, keypads, momentary switches, sliding actuators, rocker switches, click wheels, scrolling controllers, knobs, joysticks, D-pads (direction pads), touch pads, touch sliders, touch buttons, and other suitable user-actuated control interfaces. Input-output devices 130 and 148 may also include microphones, speakers, digital and analog input-output port connectors and associated circuits, cameras, etc. Wireless circuitry in input-output devices 130 and 148 may be used to receive and/or transmit wireless signals.

As shown schematically in FIG. 17, input-output devices 130 may sometimes be categorized as including user input-output devices 132 and 150, display and audio devices 134 and 152, and wireless communications circuitry 136 and 154. A user may, for example, enter user input by supplying commands through user input devices 132 and 150. Display and audio devices 134 and 152 may be used to present visual and sound output to the user. These categories need not be mutually exclusive. For example, a user may supply input using a touch screen that is being used to supply visual output data.

As indicated in FIG. 17, wireless communications circuitry 136 and 154 may include antennas and associated radio-frequency transceiver circuitry. For example, wireless communications circuitry 136 and 154 may include communications circuitry such as radio-frequency (RF) transceiver circuitry formed from one or more integrated circuits, power amplifier circuitry, passive RF components, antennas, and other circuitry for handling RF wireless signals. Wireless signals can also be sent using light (e.g., using infrared communications).

The antenna structures and wireless communications devices of devices 210 and accessory 214 may support communications over any suitable wireless communications bands. For example, wireless communications circuitry 136 and 154 may be used to cover communications frequency bands such as cellular telephone voice and data bands at 850 MHz, 900 MHz, 1800 MHz, 1900 MHz, and 2100 MHz (as examples). Wireless communications circuitry 136 and 154 may also be used to handle the Wi-Fi® (IEEE 802.11) bands at 2.4 GHz and 5.0 GHz (also sometimes referred to as wireless local area network or WLAN bands), the Bluetooth® band at 2.4 GHz, and the global positioning system (GPS) band at 1575 MHz.

Although both device 210 and accessory 214 are depicted as containing wireless communications circuitry in the FIG. 17 example, there are situations in which it may be desirable to omit such capabilities from device 210 and/or accessory 214. For example, it may be desired to power accessory 214 solely with a low-capacity battery or solely with power received through path 216 from device 210. In situations such as these, the use of extensive wireless communications circuitry may result in undesirably large amounts of power consumption. For low-power applications and situations in which low cost and weight are of primary concern, it may therefore be desirable to limit accessory 214 to low-power consumption wireless circuitry (e.g., infrared communications) or to omit wireless circuitry from accessory 214. Moreover, not all devices 210 may require the use of extensive wireless communications capabilities. A hybrid cellular telephone and media player device may benefit from wireless capabilities, but a highly portable media player such as device 10 of FIG. 1 may not require wireless capabilities and such capabilities may be omitted to conserve cost and weight if desired. Size and complexity can be minimized further by eliminating more of all media playback control buttons (e.g., play, pause, volume control, track skip, etc.) from the housing of device 210.

Transceiver circuitry 120 and 138 may be used to support communications between electronic device 210 and accessory 214 over path 216. In general, both device 210 and accessory 214 may include transmitters and receivers. For example, device 210 may include a transmitter that produces signal information that is received by receiver 142 in accessory 214. Similarly, accessory 214 may have a transmitter 140 that produces data that is received by receiver 124 in device 210. If desired, transmitters 122 and 140 may include similar circuitry. For example, both transmitter 122 and transmitter 140 may include ultrasonic tone generation circuitry (as an example). Receivers 124 and 142 may each have corresponding tone detection circuitry. Transmitters 122 and 140 may also each have DC power supply circuitry for creating various bias voltages, digital communications circuitry for transmitting digital data, or other suitable transmitter circuitry, whereas receivers 124 and 142 may have corresponding receiver circuitry such as voltage detector circuitry, digital receivers, etc. Symmetric configurations such as these may allow comparable amounts of information to be passed in both directions over link 216, which may be useful when accessory 214 needs to present extensive information to the user through input-output devices 148 or when extensive handshaking operations are desired (e.g., to support advanced security functionality).

It is not, however, generally necessary for both device 210 and accessory 214 to have identical transmitter and receiver circuitry. Device 210 may, for example, have available on-board power in the form of a rechargeable battery, whereas accessory 214 may be unpowered (and receiving power only from device 210) or may have only a small battery (for use alone or in combination with power received from device 210). In situations such as these, it may be desirable to provide device 210 and accessory 214 with different communications circuitry.

As an example, transmitter 122 in device 210 may include adjustable DC power supply circuitry. By placing different DC voltages on the lines of path 216 at different times, device 210 can communicate relatively modest amounts of data to accessory 214. This data may include, for example, data that instructs accessory 214 to power its microphone (if available) or to respond with an acknowledgement signal. A voltage detector and associated circuitry in receiver 138 of accessory 214 may process the DC bias voltages that are received from device 210. In this type of scenario, transmitter 140 in accessory 214 may include an ultrasonic tone generator that supplies acknowledgement signals and user input data (e.g., button press data) to device 210. A tone detector (e.g., an ultrasonic tone detector) in receiver 124 may decode the tone signals for device 210.

Applications running on the processing circuitry of device 210 may use the decoded user input data as control signals. As an example, a media playback application may interpret the user input as commands to skip a track, to pause, play, fast-forward, or rewind a media file, a cellular telephone application may interpret the user input as commands to answer or hang up a cellular telephone call, etc. Still other applications may interpret user button-press data or other user input as commands for making menu selection, etc.

Figure 18:
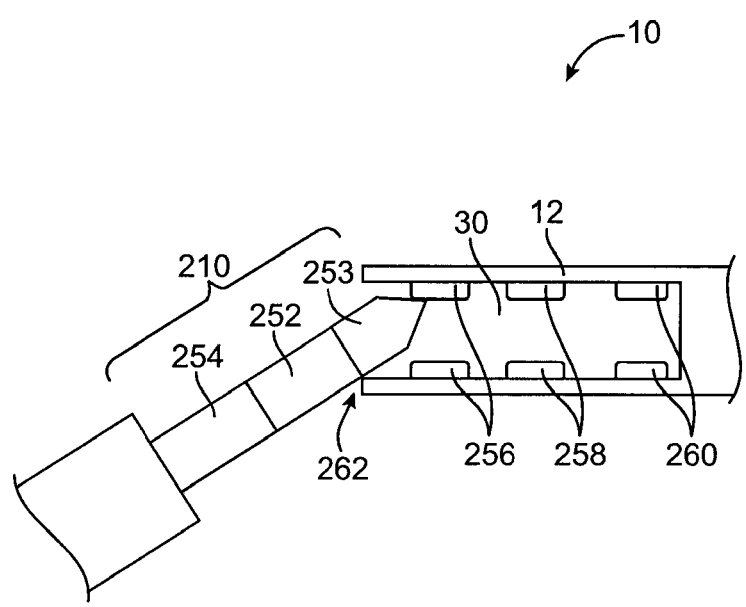
FIG. 18 is a cross-sectional side view of an illustrative portable electronic device with a female audio connector and an illustrative male audio connector in accordance with an embodiment of the present invention.

FIG. 18 illustrates one potential problem that may occur in portable electronic devices with a female audio connector and a conductive housing. As shown in FIG. 18, when a male audio connector 210 is inserted into or removed from a female audio connector 30 in device 10, a portion of the male audio connector 210 may rub against housing 12. Because housing 12 may be formed from a conductive material, contact between connector 210 and housing 12 can create undesirable electrical shorts. In the example of FIG. 18, tip contact 253 of connector 210 has shorted together housing 12 and contact 256 (e.g., sleeve contact 256) of connector 30. As shown in FIG. 18, connector 30 may include tip contacts 260, ring contacts 258, and sleeve contacts 256. In general, connectors 30 and 210 may include any suitable number of contacts (e.g., electrical paths).

With one suitable arrangement, housing 12 may be formed from a conductive material that has a nonconductive exterior surface. As one example, housing 12 may be formed from conductive aluminum with an anodized exterior surface that acts as an insulator. With this type of arrangement, while the surface of housing 12 is nonconductive, the surface of housing 12 can become conductive if the surface is sufficiently worn off (e.g., if the anodized portions are worn off).

Figure 19:
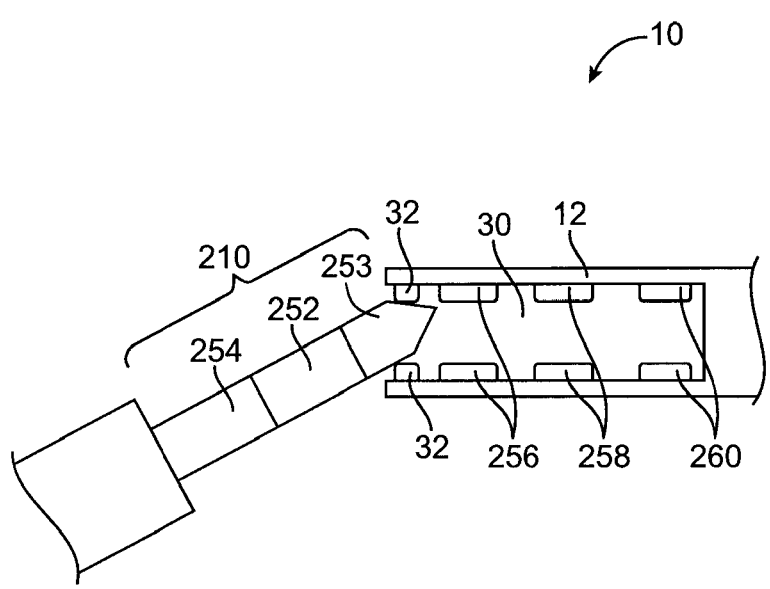
FIG. 19 is a cross-sectional side view of an illustrative portable electronic device with a female audio connector that includes a recessed insulator ring and an illustrative male audio connector in accordance with an embodiment of the present invention.

Insulator ring 32 may help to reduce the risk of the male audio connector 210 from rubbing against housing 12 when the connector 210 is being inserted into or removed from female audio connector 30. Insulator ring 32 may therefore help to prevent excessive wear on the anodized surface of housing 12 adjacent to connector 30. As shown in the cross-sectional view of FIG. 19, ring 32 may help to prevent portions of the connector 210 from directly contacting and rubbing against housing 12 when the connector 210 is being inserted into or removed from connector 30. With this type of arrangement, ring 32 may help to protect an anodized exterior surface of housing 12 adjacent to connector 30 from being inadvertently worn off when inserting and removing an audio plug (e.g., connector 210) from the audio jack (e.g., connector 30) in device 10.

The foregoing is merely illustrative of the principles of this invention and various modifications can be made by those skilled in the art without departing from the scope and spirit of the invention. battery cells on one side of the battery to form a ledge; and a flex circuit soldered to the battery cells, wherein the printed circuit board is mounted in the housing at least partially extending over the ledge and wherein the flex circuit is coupled to the processing circuitry.

What is claimed is:

1. A wearable device, comprising:
    a processing unit operable to execute a software application, the software application operable to perform a first function for which control circuitry is omitted from the wearable device;
    control circuitry operable by a user to cause the wearable device to perform a second function, different than the first function;
    wireless communication circuitry, coupled to the processing unit, that detects a control signal corresponding to the first function received from control circuitry of an external electronic device that is separate from and communicably coupled to the wearable device via a wireless communication link, wherein the wireless communication circuitry transmits information to the external electronic device via the wireless communication link;
    a touch screen configured to present visual output and receive a user input a speaker configured to provide sound output to the user;
    a microphone; and
    a camera;
    wherein the processing unit causes the software application to perform the first function in response to detection of the control signal by the wireless communication circuitry and to perform the second function in response to operation, by the user, of the control circuitry of the wearable device.

2. The wearable device of claim 1, wherein the wearable device provides output to the user using an output component of the wearable device based on the first function and the second function.

3. The wearable device of claim 2, wherein the first function provides the output according to information specified by the control signal.

4. A wearable electronic device, comprising:
    a presentation unit comprising a touch screen configured to present visual output and receive a user input;
    a processing unit operable to present a user interface via the presentation unit, the user interface including a selectable element for which the wearable electronic device does not include control circuitry, the selectable element being a portion of a menu included in the user interface; and
    wireless communication circuitry, coupled to the processing unit, operable to receive a control signal from control circuitry of an external electronic device that is separate from and communicably coupled to the wearable electronic device via a wireless communication link, the control signal corresponding to selection of the selectable element, wherein the wireless communication circuitry is operable to transmit information to the external electronic device via the wireless communication link;
    a speaker configured to provide sound output to the user;
    a microphone; and
    a camera;
    wherein the processing unit performs an action associated with the selectable element in response to the wireless communication circuitry receiving the control signal.

5. The wearable electronic device of claim 4, wherein the wearable electronic device is operable to transmit an additional control signal via the wireless communication circuitry to the external electronic device to control an operation of the external electronic device.

6. The wearable electronic device of claim 5, wherein the wearable electronic device transmits the additional control signal in response to the wireless communication circuitry receiving the control signal.

7. The wearable electronic device of claim 4, wherein the processing unit modifies the user interface in response to the wireless communication circuitry receiving the control signal.

8. The wearable electronic device of claim 4, wherein the wireless communication circuitry comprises a connector jack.

9. A wearable electronic device, comprising:
    a processing unit operable to execute a software application, the software application operable to perform a first function for which control circuitry is omitted from the wearable electronic device; and a touch screen operable by a user to cause the wearable electronic device to perform a second function, different than the first function;

a female connector, coupled to the processing unit, operable to receive a control signal corresponding to the first function from control circuitry of an additional electronic device that is separate from and communicably coupled to the wearable electronic device via the female connector, wherein the female connector is operable to transmit information to the additional electronic device;

a speaker configured to provide sound output to the user;

a microphone; and a camera;

wherein the processing unit causes the software application to perform the first function in response to receipt of the control signal via the female connector and to perform the second function in response to operation, by the user, of the touch screen of the wearable electronic device.

10. The wearable electronic device of claim 9, wherein the female connector comprises a female audio connector.

11. The wearable electronic device of claim 9, wherein the first function controls a hardware component of the wearable electronic device.

12. The wearable electronic device of claim 9, wherein communicably coupling the wearable electronic device to the additional electronic device includes performing a handshaking operation.

13. The wearable electronic device of claim 12, wherein the handshaking operation is performed via the female connector.

14. The wearable electronic device of claim 9, wherein the control signal comprises an optical signal.

\* \* \* \* \*

UNITED STATES PATENT AND TRADEMARK OFFICE
CERTIFICATE OF CORRECTION

PATENT NO. : 11,627,412 B2
APPLICATION NO. : 14/570038
DATED : April 11, 2023
INVENTOR(S) : John Benjamin Filson et al.

Page 1 of 1

It is certified that error appears in the above-identified patent and that said Letters Patent is hereby corrected as shown below:

In the Claims

Column 20, Line 6 (Claim 1): Add "," after --input--.

Signed and Sealed this
Fifteenth Day of August, 2023

Katherine Kelly Vidal
*Director of the United States Patent and Trademark Office*